(12) United States Patent
Itoh

(10) Patent No.: US 7,924,474 B2
(45) Date of Patent: Apr. 12, 2011

(54) IMAGE PROCESSING APPARATUS

(75) Inventor: Shingo Itoh, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1086 days.

(21) Appl. No.: 11/616,960

(22) Filed: Dec. 28, 2006

(65) Prior Publication Data

US 2007/0153339 A1 Jul. 5, 2007

(30) Foreign Application Priority Data

Dec. 29, 2005 (JP) .................................. 2005-380561

(51) Int. Cl.
*H04N 1/04* (2006.01)

(52) U.S. Cl. ......... 358/474; 358/400; 358/404; 358/500

(58) Field of Classification Search .................. 358/474, 358/400, 404, 500, 496, 497
See application file for complete search history.

(56) References Cited

U.S. PATENT DOCUMENTS

| | | | |
|---|---|---|---|
| 5,223,948 A * | 6/1993 | Sakurai et al. ................. | 358/404 |
| 6,209,861 B1 | 4/2001 | Kakuta et al. | |
| 7,567,354 B2 | 7/2009 | Takaaki | |
| 7,751,099 B2 | 7/2010 | Mizuhashi et al. | |
| 2003/0107765 A1 * | 6/2003 | Suzuki et al. ................. | 358/1.18 |
| 2004/0190084 A1 | 9/2004 | Takaaki | |
| 2005/0122544 A1 | 6/2005 | Mizuhashi et al. | |

FOREIGN PATENT DOCUMENTS

| | | |
|---|---|---|
| JP | 5-014687 A | 1/1993 |
| JP | 5-068151 A | 3/1993 |
| JP | 6-152894 A | 5/1994 |
| JP | 8-085649 A | 4/1996 |
| JP | 8-163503 A | 6/1996 |
| JP | 9-326904 A | 12/1997 |
| JP | 10-016321 A | 1/1998 |
| JP | 10-116339 A | 5/1998 |
| JP | 11-263500 A | 9/1999 |
| JP | 2000-101821 A | 4/2000 |
| JP | 2000-332970 | * 11/2000 |
| JP | 2002-176543 A | 6/2002 |
| JP | 2004-304414 A | 10/2004 |
| JP | 2004-312242 A | 11/2004 |
| JP | 2005-039761 A | 2/2005 |

OTHER PUBLICATIONS

JP Office Action dtd Apr. 13, 2010, JP Appln. 2005-380561, English translation.
JP Office Action dtd Sep. 14, 2010, JP Appln. 2005-380561, English translation.

* cited by examiner

*Primary Examiner* — Houshang Safaipour
(74) *Attorney, Agent, or Firm* — Banner & Witcoff, Ltd.

(57) ABSTRACT

An image processing apparatus is provided which can execute a rotation process of an image when there is insufficient storage capacity. In a multi-function device to read images on two sides of a document by reversing a transfer direction of the document in an automatic document feeder, an estimated available capacity can be obtained based on a previously set condition, such as the resolution or gradation of an image scanner. Based on the estimated available capacity, it can be judged whether the rotation process can be performed. When the rotation process can not be performed, a process to reduce a set value of the condition is executed. When the set value of the condition is reduced, an attempt can be made to execute the process under the reduced set value.

21 Claims, 17 Drawing Sheets

US 7,924,474 B2

IMAGE PROCESSING APPARATUS

CROSS REFERENCE TO RELATED APPLICATION

This application claims priority from Japanese Patent Application No. 2005-380561, filed on Dec. 29, 2005, the entire subject matter of which is incorporated herein by reference.

FIELD

Aspects of the invention relate to an image processing apparatus in which scanned image data is stored in a storage section, and then image processing, such as facsimile communication or image recording, is performed based on the image data stored in the storage section.

BACKGROUND

There is known a facsimile apparatus in which scanned image data is once stored in a semiconductor memory (hereinafter abbreviated to a "memory"), and after a series of scanning processes is completed, the image data is sequentially read out from the memory and is transmitted to a specified transmission partner. Hitherto, as the facsimile apparatus, there is known one provided with an image reading device including an ADF (Auto Document Feeder) to transfer a document from an input tray through a transfer path to an output tray. In addition, as the ADF, in JP-A-6-85649 to scan images recorded on two sides of a first side (front side) and a second side (back side) of a document in a series of document transfer operations, the transfer direction of the document is reversed in the transfer process of transferring the document from the input tray through the transfer path to the output tray, and the transfer for the two-sided scanning of the document is performed.

In the facsimile apparatus, in the case where the document has images on two sides and the images of the document are read out and are transmitted to the transmission partner, since the transfer direction of the document is reversed, the directions of the first side image (front side image) and the second side image (back side image) are different from each other by 180°.

There is proposed a digital image forming apparatus in JP-A-152894 in which an electric sort function is provided in which image data for plural pages are stored in a memory and the image data is repeatedly and sequentially read out from the memory so that sort is performed, and in the case where the memory free capacity becomes a specified capacity or less, the data amount of a read image is reduced by performing a processing to reduce the gradation per pixel.

SUMMARY

According to an illustrative aspect of the invention, an image processing apparatus includes a reading section that reads an image of a document based on a specified condition, a transfer element that transfers a first side of the document to the reading section along a first path and transfers a second side of the document to the reading section in an opposite direction to a document transfer direction of the first side along a second path, a storage section that stores image data read by the reading section, an estimate section that estimates an amount of data to be read by the reading section based on estimate information, a judgment section that judges whether a rotation process to rotate one of a first side image and a second side image read by the reading section can be performed based on the estimated data amount and the available storage capacity of the storage section, and a change section that changes the specified condition to reduce the data amount of the first side or the second side to be read by the reading section when the judgment section judges that the rotation process can not be performed.

DETAILED DESCRIPTION

Figure 1:
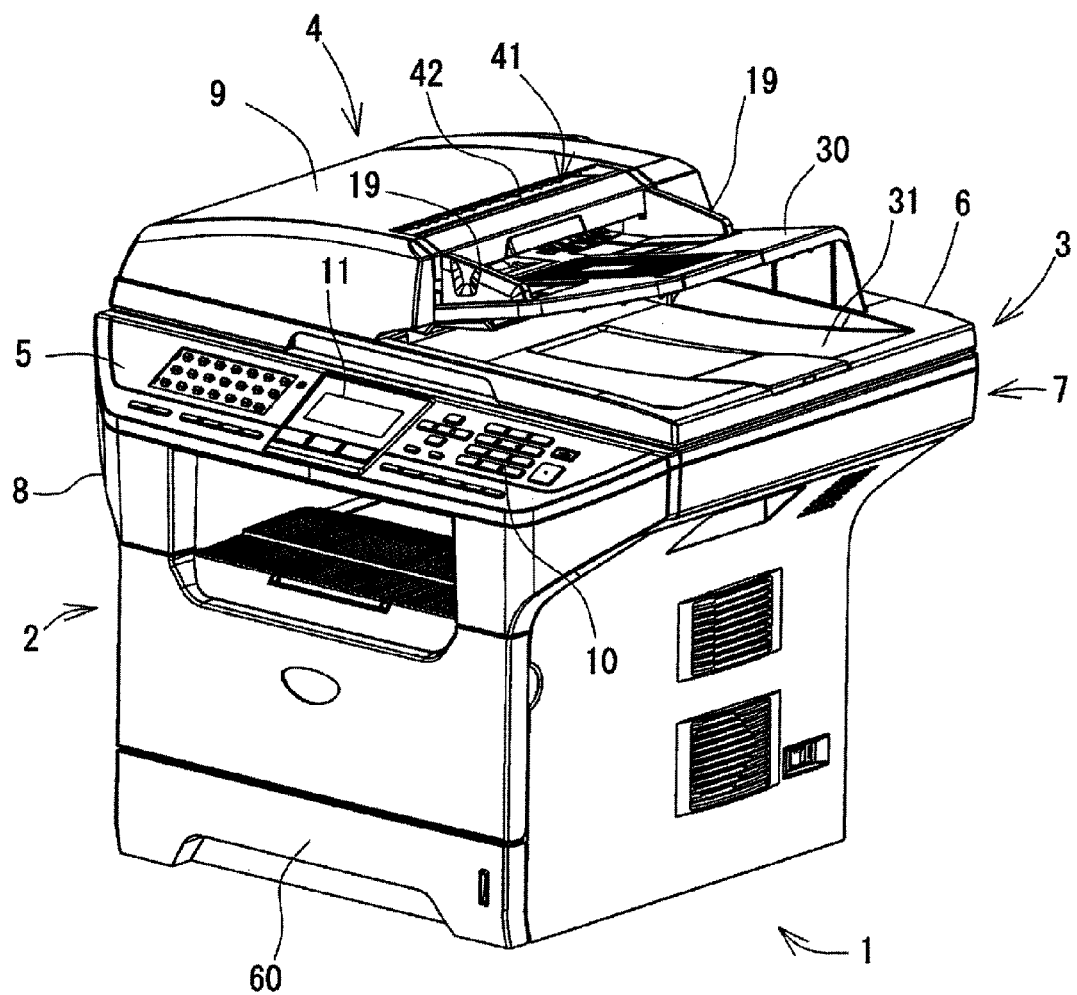
FIG. 1 is a perspective view of a MFD as an example of an image processing apparatus according to aspects of the invention.

FIG. 1 shows a perspective view of a multi function device (MFD) 1 according to aspects of the present invention. The MFD 1 can be realized as an image processing apparatus for processing the image of a document in a copier, a facsimile machine, a scanner or a MFD, which integrally combines the functions of each of the aforementioned devices. In the FIG. 1 implementation, the MFD 1 includes a printer 2 disposed at the lower part, a scanner 3 disposed above the printer 2, and a document cover 6 including an Auto Document Feeder (ADF) 4. Also, an operation panel 5 s disposed at the front side of the upper surface of the MFD 1. Incidentally, it is not necessary that the multiple functions are integrally provided to realize the aspect of the present invention; a dedicated machine having only a scanning function may be adopted.

In the scanning function of the MFD 1, image data scanned by the scanner 3 is transferred to a Personal Computer (PC) (not shown) or a device such as a memory card, an internal memory, or a Universal Serial Bus (USB) memory. The copy function records an image scanned in the scanner 3 on a recording sheet in the printer 2. Additionally, the print function records an image or a document on a recording sheet by the printer 2 based on data including the image data or document data transferred from an external device such as a PC. Further, the facsimile communication function of the MFD 1 transmits the image data scanned by the scanner 3 to the communication partner through a specified communication network, for example a telephone line.

Illustrative aspects of the present invention will be described with suitable reference to the accompanying drawing. These aspects merely provide examples of the invention, and it is needless to say that the aspects can be suitably modified without departing from the gist of the invention.

(Operation Panel)

The operation panel 5 for operating the printer 2 or the scanner 3 is provided on the upper surface of the scanner 3 at the front side which is also the upper surface of the MFD 1 at the front side. Various operation keys 10, a liquid crystal display (LCD) 11 and the like are disposed on the operation panel 5. As the various operation keys, there are disposed, for example, a start button for starting the operation of the printer or the scanner 3, a stop button for stopping the operation or completing the setting, a mode selection key for selecting each function such as a print function, a scan function or a facsimile function, and a numeric keypad or an arrow key for inputting setting information, such as the number of copies, and the resolution and gradation of image data scanned by the scanner 3. The present operation state of the MFD 1, a user operation guide, setting information, error information or the like is displayed on the liquid crystal display 11.

The MFD 1 is controlled by a controller 100 (see FIG. 4) to operate in accordance with instructions inputted from the operation panel 5. Incidentally, in the case where the MFD 1 is connected to a PC (not shown), the MFD 1 is operated based on instructions transmitted from a printer driver or a scanner driver installed in the PC. When the user depresses the specified operation key 10 of the operation panel 5, a specified instruction is transmitted to the controller 100 (see FIG. 4) of the MFD 1. As a result, the MFD 1 is controlled by the controller 100 so that it performs an operation corresponding to the transmitted instruction. For example, when a facsimile mode key is depressed by the user, the MFD 1 is set in the facsimile mode, and is controlled so that the facsimile communication to transmit image data to the specified transmission partner can be performed.

(Document Cover)

Figure 2:
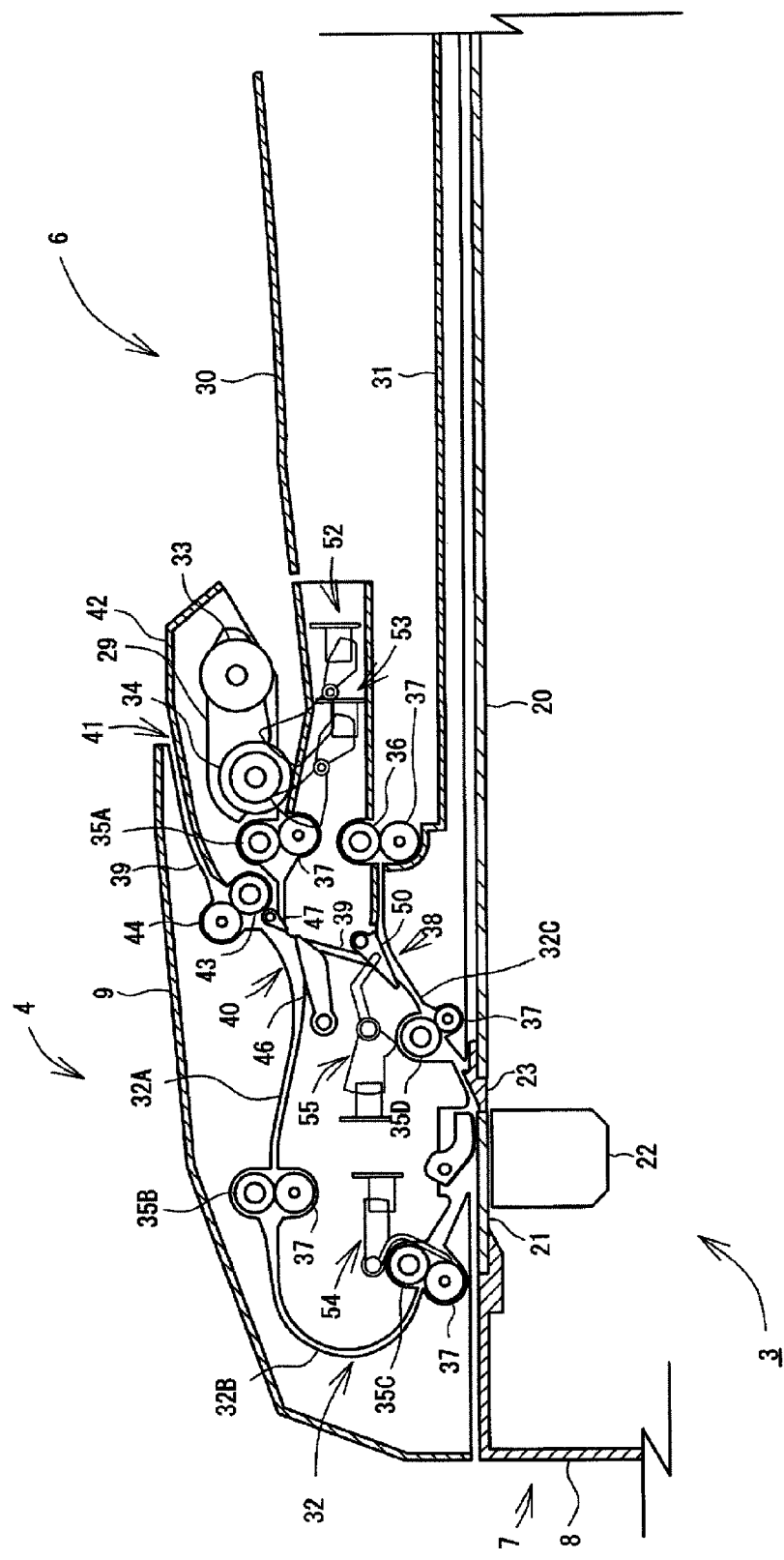
FIG. 2 is a longitudinal sectional view showing an inner structure of an ADF 4 according to aspects of the invention.

FIG. 2 is a longitudinal sectional view showing an inner structure of the ADF 4. As shown in FIG. 1 and FIG. 2, the document cover 6 is openably/closably attached to a document placing table 7 constituting the scanner 3 through a hinge (not shown) at the back side of the apparatus. The document cover 6 is provided with the ADF 4 to automatically and continuously transfer a document to an output tray 31 through a transfer path 32 (see FIG. 2) from an input tray 30 on which the document is placed.

As shown in FIG. 1 and FIG. 2, the input tray 30 on which the document is placed and the output tray 31 to which the document is discharged are provided at the upper surface of the document cover 6. The input tray 30 and the document discharge tray 31 are connected through the transfer path 32. The ADF 4 provided at the document cover 6 is for automatically and continuously transferring the document to the output tray 31 through the transfer path 32 from the input tray 30. In the transfer process by the ADF 4, the document passes through a scanning position on a slit glass 21, and the image of the document is scanned by an image scanner 22 which is on standby at the lower part of the scanning position.

The input tray 30 and the output tray 31 are provided to form upper and lower stages at the upper surface of the document cover 6. Specifically, the output tray 31 is provided below the input tray 30. The input tray 30 is for stacking documents for which scanning is performed by the ADF 4, and the plural documents are placed on the input tray 30 where their front sides (first sides) point upward and in such a manner that their leading edges in the transfer direction of the feed direction are inserted into the transfer path 32.

In the input tray 30, a pair of document guides 19 (see FIG. 1) separated from each other in the depth direction of the MFD 1 is provided to be capable of sliding in the depth direction. The document guides 19 rise from the input tray 30 and restrain the position of the document in the width direction placed on the input tray 30. By a well-known interlocked mechanism, when one of the document guides 19 is slidably moved, the other of the document guides 19 is interlocked and is slidably moved. Accordingly, when a document is stacked on the input tray 30, and one of the document guides 19 is slid, the document is restrained so that the center of the document is always located at a constant position.

The output tray 31 is located below the input tray 30, and is integrally formed at the upper surface of the document cover 6. Accordingly, documents discharged from the ADF 4 are sequentially stacked on the output tray 31. Incidentally, in this aspect, as described later, the document is discharged to the output tray 31 in the state where the first side of the document faces downward.

As shown in FIG. 2, the transfer path 32 extending between the input tray 30 and the output tray 31 is provided inside the ADF 4. The transfer path 32 is formed to have a sideways, substantially U-shaped form when viewed in a longitudinal section. The transfer path 32 is continuously formed as a path with a specified width along which the document can pass and includes members constituting the ADF main body, guide plates and the like. In detail, the transfer path 32 has such a shape that it is extended from the input tray 30 to one end side (left side of the paper plane of FIG. 2) of the document cover 6, curves downward so as to be inverted, leads to the scanning position on the slit glass 21, and extends from the scanning position to the output tray 31. The transfer path 32 roughly includes an upper portion 32A and a lower portion 32C forming straight portions, and a curved portion 32B curved so as to connect the upper portion 32A and the lower portion 32C. The transfer path 32 is common to one-sided scanning and two-sided scanning of a document by the ADF 4, and is used as the transfer path of the document.

Roller members constituting transfer elements for transferring the document are provided in the transfer path 32. In detail, as shown in FIG. 2, a pickup roller 33, a separation roller 34, feed rollers 35A, 35B, 35C, and 35D, a discharge roller 36, and pinch rollers 37 which respectively contact the rollers 35A-35D and 36, are provided in the transfer path 32. One skilled in the art will appreciate that the structure of each of the rollers constituting the transfer elements is illustrative, and the number of rollers and the arrangement thereof can be changed, and other well-known transfer mechanisms can be applied.

The pickup roller 33 and the separation roller 34 are provided in the vicinity of the most upstream portion of the transfer path 32. The pickup roller 33 is rotatably provided at the tip end of an arm 29 provided coaxially with the rotation shaft of the separation roller 34. Also, the separation roller 34 is rotatably provided at a position separated from the pickup roller 33 in the paper feed direction so as to come in contact with the opposite surface of the transfer path 32. Driving force from a motor such as a stepping motor is provided to rotationally drive the pickup roller 33 and the separation roller 34. The driving force from the motor is transmitted to the arm 29 so that it is vertically moved. The pickup roller 33 and the separation roller 34 have the same diameter, and are rotated at the same peripheral speed. A friction pad (not shown) which makes pressing contact with the separation roller 34 and separates the document by friction is disposed at the opposite position of the separation roller 34.

The feed rollers 35A, 35B, 35C and 35D are respectively disposed at different positions along the transfer path 32. In this illustrative aspect, the feed roller 35A is disposed at the immediate downstream side of the separation roller 34, the feed roller 35B is disposed along the upper portion 32A of the transfer path 32, the feed roller 35C is disposed along the lower portion 32C of the transfer path 32 and at the immediate upstream side of the scanning position, and the feed roller 35D is disposed at the lower portion 32C of the transfer path 32 and at the immediate downstream side of the scanning position. The driving force from a motor (not shown) is provided to rotationally drive the feed rollers 35A, 35B, 35C and 35D. It will be appreciated that this arrangement is an example, and the number and arrangement of the feed rollers 35A, 35B, 35C and 35D can be suitably changed.

The pinch rollers 37 are respectively provided at positions opposite the respective feed rollers 35A, 35B, 35C and 35D. The shaft of each of the pinch rollers 37 is elastically urged by a spring to cause the pinch rollers 37 to making pressing contact with the roller surfaces of the respective feed rollers 35A, 35B, 35C and 35D. When the respective feed rollers 35A, 35B, 35C and 35D rotate, the pinch rollers 37 are rotated in accordance with the rotation. The document is pressed to the respective feed rollers 35 by the respective pinch rollers 37, and the rotation forces of the respective feed rollers 35A, 35B, 35C and 35D are transmitted to the document.

The discharge roller 36 is disposed in the vicinity of the most downstream portion of the transfer path 32. Similarly to the feed rollers 35, the driving force from the motor is provided to rotationally drive the discharge roller 36. The pinch roller 37 is provided also at a position opposite the discharge roller 36, and the pinch roller 37 is elastically urged by a spring and to make pressing contact with the discharge roller 36.

A bidirectional path 39 is connected to a connection position 38 of the lower portion 32C of the transfer path 32. The bidirectional path 39 is used, in the case where two-sided scanning is performed, in order to transfer a document, the image of the first side of which was scanned at the scanning position, to the transfer path 32 from the downstream side of the scanning position in the transfer direction to the upstream side in the transfer direction after the leading edge and the trailing edge are reversed. The bidirectional path 39 extends from the connection position 38 to the upper side of the input tray 30 obliquely upward, and intersects with the upper portion 32A of the transfer path 32. The document is returned to the transfer path 32 from an intersection position 40 between the upper portion 32A and the bidirectional path 39. It will be appreciated that the bidirectional path 39 shown in FIG. 2 is merely an example for reversing the transfer direction of the document. As long as the transfer direction of the document can be reversed, various transfer paths can be adopted instead of the bidirectional path 39.

An end 41 of the bidirectional path 39 opens at the upper surface of the ADF 4. A document support section 42 continuous with the end 41 is formed at the side of the input tray 30 from the end 41 of the bidirectional path 39. The document support section 42 supports a document protruding from the end 41 of the bidirectional path 39, and forms an upper cover 9 of the ADF 4 at an upper side of the pickup roller 33 and the separation roller 34. The upper cover 9 is openably/closably formed with respect to the ADF 4, and the ADF 4 including the pickup roller 33 and the separation roller 34 is covered with the upper cover 9. The document support section 42 extends from the end 41 toward the input tray 30 side and to the upstream side of the paper feed position provided by the pickup roller 33 and the separation roller 34.

A reversible roller 43 is disposed at the end 41 of the intersection position 40 of the bidirectional path 39. Driving force from a motor is transmitted and the reversible roller 43 is rotationally driven in both forward and reverse directions. A pinch roller 44 is provided at a position opposite the reversible roller 43. The shaft of the pinch roller 44 is elastically urged by a spring, so that the pinch roller 44 makes pressing contact with the roller surface of the reversible roller 43 and is rotated in accordance with the rotation of the reversible roller 43. The document is brought to make pressing contact with the reversible roller 43 by the pinch roller 44, and the rotation force of the reversible roller 43 is transmitted to the document.

As shown in FIG. 2, a guide flap 46 and a guide flap 47 for guiding the document to a desired transfer path are disposed at the intersection position 40. The guide flap 46 is disposed to be rotatable in a specified range while a corner part at the scanning position side of the transfer path 32 at the intersection position 40 and at the connection position 38 side of the bidirectional path 39 functions as a rotation shaft. The guide flap 46 is a blade-shaped flat plate, and its tip end protrudes to the intersection position 40. In the drawing, although only one guide flap 46 is shown, plural guide flaps 46 with the same shape can be provided at specified intervals in the width direction (vertical direction to the paper plane of FIG. 2, the apparatus depth direction) of the transfer path 32, and the plural guide flaps 46 can be integrally rotated.

The guide flap 46 can be rotated from the position shown in FIG. 2 to the upper side in the drawing. Besides, the guide flap 46 comes in contact with a guide member forming the transfer path 32 or the bidirectional path 39, so that the rotation from the position shown in FIG. 2 to the lower side in the drawing is restrained. When the guide flap 46 is located at the position shown in FIG. 2, the transfer path from the input tray 30 side (right side in the drawing) of the transfer path 32 to the scanning position side (left side in the drawing) becomes continuous at the intersection position 40, and the transfer path from the transfer path 32 to the connection position 38 side (lower side in the drawing) of the bidirectional path 39 is closed. By this, the document having reached the intersection position 40 from the input tray 30 side of the transfer path 32 is allowed to enter the scanning position side of the transfer path 32, and is inhibited from entering the connection position 38 side of the bidirectional path 39. Also, the document having reached the intersection position 40 from the end 41 side (upper side in the drawing) of the bidirectional path 39 is allowed to enter the scanning position side of the transfer path 32, and is inhibited from entering the connection position 38 side of the bidirectional path 39.

The guide flap 46 is pivoted upward in the drawing, so that the transfer path from the connection position 38 side of the bidirectional path 39 to the end 41 side becomes continuous, and the transfer path from the connection position 38 side of the bidirectional path 39 to the scanning position side of the transfer path 32 is closed. By this, the document having reached the intersection position 40 from the connection position 38 side of the bidirectional path 39 is allowed to enter the end 41 side of the bidirectional path 39 and is inhibited from entering the scanning position side of the transfer path 32.

The change of the transfer path by the guide flap 46 is performed by the contact of the document. The guide flap 46 is always located at the position shown in FIG. 2 by its own weight or by receiving the urging force of an elastic member such as a spring. When the document transferred along the bidirectional path 39 from the connection position 38 to the intersection position 40 comes in contact with the guide flap 46, the guide flap 46 is pushed upward in the drawing and is rotated. On the other hand, the document transferred from the end 41 side of the bidirectional path 39 to the intersection position 40 comes in contact with the guide flap 46. However, since the guide flap 46 is restrained so that it does not rotate from the position shown in FIG. 2 to the lower side in the drawing, the document is guided by the guide flap 46, and enters the scanning position side through the upper portion 32A of the transfer path 32. The blade shape of the guide flap 46 is adopted such that the position is easily changed by the contact of the document transferred from the connection position 38 side of the bidirectional path 39 to the intersection position 40, and the document transferred from the end 41 side of the bidirectional path 39 to the intersection position 40 is easily guided to the scanning position side of the transfer path 32.

The guide flap 47 is disposed to be pivotable in a specified range while a corner part at the input tray 30 side of the transfer path 32 at the intersection position 40 and at the end 41 side of the bidirectional path 39 functions as the rotation shaft. The guide flap 47 is a blade-shaped flat plate, and its tip end protrudes to the intersection position 40. In the drawing, although only one guide flap 47 is shown, plural guide flaps 47 with the same shape can be provided at specified intervals in the width direction of the transfer path 32, and the plural guide flaps 47 can be integrally rotated.

The guide flap 47 can be pivoted from the position shown in FIG. 2 to the left side in the drawing. The guide flap 47 comes in contact with, for example, the guide member forming the transfer path 32 or the bidirectional path 39, so that the rotation from the position shown in FIG. 2 to the right side in the drawing is restrained. When the guide flap 47 is located at the position shown in FIG. 2, the transfer path from the end 41 side of the bidirectional path 39 to the scanning position side of the transfer path 32 becomes continuous, and the transfer path from the connection position 38 side of the bidirectional path 39 to the input tray 30 side of the transfer path 32 is closed. By this, the document having reached the intersection position 40 from the end 41 side of the bidirectional path 39 is allowed to enter the scanning position side of the transfer path 32, and is inhibited from entering the input tray 30 side. Additionally, the document having reached the intersection position 40 from the connection position 38 side of the bidirectional path 39 is allowed to enter the end 41 side of the bidirectional path 39, and is inhibited from entering the input tray 30 side of the transfer path 32.

When the guide flap 47 is rotated to the left side in the drawing, the transfer path from the input tray 30 side of the transfer path 32 to the scanning position side becomes continuous, and the transfer path from the input tray 30 side of the transfer path 32 to the end 41 side of the bidirectional path 39 is closed. By this, the document having reached the intersection position 40 from the input tray 30 side of the transfer path 32 is allowed to enter the scanning position side of the transfer path 32, and is inhibited from entering the end 41 side of the bidirectional path 39.

The change of the transfer path by the guide flap 47 is performed by the contact of the document. The guide flap 47 is always located at the position shown in FIG. 2 by its own weight or by receiving the urging force of an elastic member such as a spring. When the document transferred from the input tray 30 side of the transfer path 32 comes in contact with the guide flap 47, the guide flap 47 is pushed to the left side in the drawing and is rotated. On the other hand, even if the document transferred from the connection position 38 side of the bidirectional path 39 to the intersection position 40 comes in contact with the guide flap 47, since the guide flap 47 is restrained from rotating to the right side in the drawing from the position shown in FIG. 2, the document is guided by the guide flap 47 and enters the end 41 side of the bidirectional path 39. As the blade shape of the guide flap 47, the shape is adopted such that the position is easily changed by the contact of the document transferred from the input tray 30 side of the transfer path 32 to the intersection position 40, and the document transferred from the connection position 38 side of the bidirectional path 39 to the intersection position 40 is easily guided to the end 41 side of the bidirectional path 39.

As shown in FIG. 2, a guide flap 50 is disposed at the connection position 38. The guide flap 50 is disposed to be rotatable while the place between the bidirectional path 39 branching from the transfer path 32 at the connection position 38 and the lower portion 32C of the transfer path 32 continuous with the output tray 31 side functions as the rotation shaft. Driving force is transmitted from a motor (not shown) to rotate the guide flap 50 from the position shown in FIG. 2 to the lower side in the drawing. The guide flap 50 comes in contact with, for example, the guide member forming the transfer path 32 or the bidirectional path 39, so that the rotation from the position shown in FIG. 2 to the upper side in the drawing is refrained. The guide flap 50 is rotated to the lower side in the drawing to be located at the position where the document is guided to the bidirectional path 39, and is refrained from being further rotated to the lower side in the drawing. In the case where the guide flap 50 is located at the position shown in FIG. 2, at the connection position 38, the transfer path from the scanning position side (left side in the drawing) of the transfer path 32 to the output tray 31 side (right side in the drawing) becomes continuous. By this, the document having passed through the scanning position is guided along the lower portion 32C of the transfer path 32 to the output tray 31 at the connection position 38. The guide flap 50 is rotated from the position shown in FIG. 2 to the lower side in the drawing, and the transfer path from the downstream side of the scanning position of the lower portion 32C of the transfer path 32 to the bidirectional path 39 becomes continuous. By this, the document having passed through the scanning position is guided at the connection position 38 to enter the bidirectional path 39. In this way, the guide flap 50 is disposed so that at the connection position 38, the document can be guided to the transfer path of one of the transfer path 32 to the output tray 31 and the bidirectional path 39. In the drawing, although only one guide flap 50 is shown, plural guide flaps 50 with the same shape can be provided at specified intervals in the width direction of the transfer path 32, and the plural guide flaps 50 can be integrally rotated.

As shown in FIG. 2, plural sensors for detecting the transfer of the document can be provided in the transfer path 32 and the bidirectional path 39. In detail, in the transfer path 32, a first front sensor 52 and a second front sensor 53 are disposed at the upstream side and the downstream side of the separation roller 34 respectively, and a rear sensor 54 is disposed at the immediate upstream side of the scanning position. A sensor 55 is disposed between the connection position 38 of the bidirectional path 39 and the intersection position 40. Each of the sensors can be a so-called optical sensor to detect the rotation of a probe appearing in the transfer path 32 or the bidirectional path 39 as on/off of a photo interrupter.

When the document is placed on the input tray 30 while the tip end of the document in the transfer direction comes in contact with the separation roller 34, the first front sensor 52 is turned on. Whether a document is placed on the input tray 30 is detected by the on/off status of the first front sensor 52.

The second front sensor 53 disposed at the immediate downstream side of the separation controller 34 is for detecting, by its on/off status, the length of the document in the transfer direction fed to the transfer path 32. The distance between the second front sensor 53 and the connection position 38 of the transfer path 32 is longer than the length of the document in the transfer direction, the two sides of which can be read by the image scanning apparatus 1. In other words, the second front sensor 53 is provided at a position located at the upstream side in the transfer direction from the connection position 38 of the transfer path 32 and spaced therefrom by a length longer than the length of the document in the transfer direction, the two sides of which can be read. Accordingly, whether the document is longer than the specified length in the transfer direction can be judged by detecting whether the second front sensor 53 detects the trailing edge of the document in the transfer direction when the leading edge of the document in the transfer direction reaches the specified position at the upstream side of the connection position 38 of the transfer path 32 in the transfer direction.

Whether two-sided scanning can be performed by the image scanning apparatus 1 is judged by whether transfer for two-sided scanning can be performed by the ADF 4. In two-sided scanning, the document having passed through the scanning position of the transfer path 32 is guided to the bidirectional path 39 and is transferred, and is returned to the upstream side of the scanning position of the transfer path 32 from the intersection position 40. When the document having the length in the transfer direction longer than the loop-shaped transfer distance from the intersection position 40 of the transfer path 32 through the scanning position, the connection position 38, and the bidirectional path 39 to the intersection position 40 enters the bidirectional path 39 from the connection position 38 of the transfer path 32 and reaches the intersection position 40, the leading edge side of the document in the transfer direction comes in contact with the trailing edge side in the transfer direction at the intersection position 40, and a paper jam or damage to the document can result. Accordingly, it is desirable that the document having a length in the transfer direction longer than the loop-shaped transfer distance be prevented from being transferred for two-sided scanning by the ADF 4. It will be appreciated that it is not necessary that the second front sensor 53 be provided only for detecting the length of the document in the transfer direction. The second front sensor 53 may be used for other purposes, for example, in order to perform the registration of the document, whether the leading edge of the document in the transfer direction reaches the feed roller 35B can be judged by the detection signal of the second front sensor 53, the rotation amount of a motor and the like.

The rear sensor 54 disposed at the immediate upstream side of the scanning position is for detecting, by its on/off status, the leading edge and the trailing edge of the document transferred along the transfer path 32. The number of rotations of the feed rollers 35A, 35B, 35C and 35D from the time when the rear sensor 54 detects the leading edge or the trailing edge of the document is monitored by the number of steps of an encoder or a motor. The image scanner 22 can be controlled based on the detection signal of the rear sensor 54. In addition, the timing when the second front sensor 53 detects the presence/absence of the document in order to judge the length of the document in the transfer direction is the time when a judgment is made based on the detection signal of the rear sensor 54 that the leading edge of the document in the transfer direction reaches the specified position at the upstream side of the connection position 38 in the transfer direction.

The sensor 55 disposed between the connection position 38 of the bidirectional path 39 and the intersection position 40 is for detecting, by its on/off status, the leading edge or the trailing edge of the document transferred along the bidirectional path 39. For example, whether the trailing edge of the document passes through the intersection position 40 is judged by monitoring, through the number of steps of an encoder or a motor, the number of rotations of the feed rollers 35A, 35B, 35C and 35D and the reversible roller 43 after the sensor 55 detects the trailing edge of the document.

(Scanner Section)

Next, the structure of the scanner 3 will be described. As shown in FIG. 1 and FIG. 2, the scanner 3 includes the document placing table 7 functioning as an FBS (Flatbet Scanner). The document placing table 7 forms a part of the housing of the MFD 1, and constitutes a part of the upper surface of the apparatus. Platen glasses 20 and 21 (see FIG. 2) are disposed at the upper surface of the document placing table 7. When the document cover 6 is closed as shown in FIG. 1, the upper surface of the document placing table 7 including the platen glasses 20 and 21 is covered. In this closed state, the document cover 6 forms a part of the upper surface of the apparatus.

As shown in FIG. 2, the document placing table 7 includes a main body frame 8 of a substantially rectangular parallelepiped, the platen glasses 20 and 21 (see FIG. 2) provided on the upper surface of the main body frame 8, and the image scanner 22 incorporated in the main body frame 8. The main body frame 8 constitutes a part of the housing of the MFD 1. The image scanner 22 is disposed inside of the main body frame 8 so as to be opposed to the back surfaces of the platen glasses 20 and 21. The image scanner 22 is supported by a carriage (not shown) so as to be movable in a direction (sub-scanning direction) perpendicular to the depth direction (main scanning direction) of the MFD 1.

In the case where the scanner 3 is used as the FBS, the document is placed on the platen glass 20 which is made of, for example, a transparent glass plate. An opening for exposure of the platen glass 20 is formed at the center of the upper surface of the document placing table 7, and the platen glass 20 is fitted in the opening so that its surface is exposed to the outside. The surface of the platen glass 20 becomes a document placing area in the FBS.

The image scanner 22 is a line image sensor in which the depth direction of the MFD 1 is the main scanning direction. In detail, the image scanner 22 is a contact-type contact image sensor (CIS) integrally including a light source, a lens for condensing light, which is irradiated to the document from the light source through the platen glasses 20 and 21 and is reflected from the document, and a light receiving element, such as a linear photosensor, to receive the light condensed by the lens and to convert it into an electric signal. The image scanner 22 reads the image of the document based on the scanning timing, the scanning condition and the like outputted from the CPU 101. Also, as the image scanner 22, instead of the CIS, for example, an image sensor, such as a CCD (Charge Coupled Device) of a reduction optical system or a CMOS (Complementary Metal-Oxide Semiconductor), can be applied.

(Printer Section)

Figure 3:
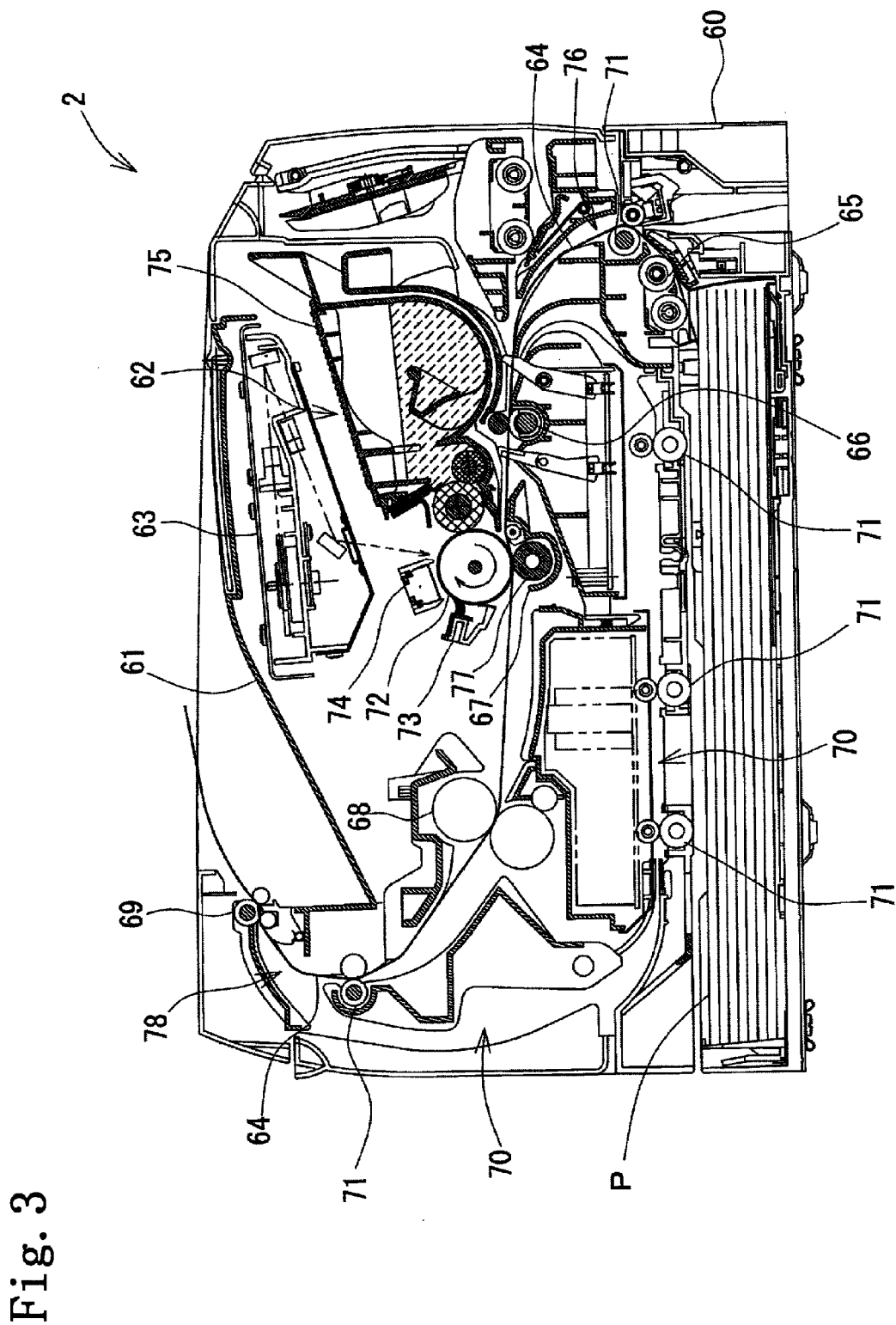
FIG. 3 is a longitudinal sectional view showing a printer according to aspects of the invention.

FIG. 3 is a schematic sectional view schematically showing a sectional structure of the printer 2. Hereinafter, the rough structure of the inside of the printer 2 will be briefly described with reference to the drawing.

The printer 2 is for performing a so-called electrophotographic image formation process, and roughly includes a paper feed cassette 60 provided at the lowest part, a paper output tray 61 provided at the front upper part of the printer 2, a process unit 62, a laser scanning unit 63, a sheet transfer path 64 that leads to the side of the paper output tray 61 nearer the front side of the paper feed cassette 60 and has a substantially lateral S-shape, a paper feed roller 65, a register roller 66, a transfer device 67, a fixing device 68, and a discharge roller 69 disposed along the sheet transfer path 64 from the paper feed cassette 60 side sequentially. Besides, there is provided an invert path 70 that reverses the transfer direction of the recording sheet on the first side of which an image has been recorded and guides it to the sheet transfer path 64 at the upstream side of the process unit 62. The invert path 70 is formed to extend through the upper part of the paper feed cassette 60 to the upstream side of the process unit 62. Transfer rollers 71 are suitably disposed on the sheet transfer path 64 and the invert path 70.

The process unit 62 includes a photoconductive drum 72 disposed at a position opposite to the transfer device 67 through the sheet transfer path 64, a conductive brush 73, a charging device 74, a development unit 75 and the like sequentially disposed around the photoconductive drum 72 from the transfer device 67 side to the downstream side in the rotation direction of the photoconductive drum 72. The image formation process of the printer 2 in this aspect can be suitably changed, and in addition to the electrophotographic system, it is, of course, possible to adopt, for example, an inkjet system or a thermal system (heat sensitive system).

In the case where a two-sided copy function is set in a copy mode, in a discharge process using the discharge roller 69, the recording sheet P on the first side of which an image has been recorded is stopped in the state where the trailing edge of the recording sheet in the transfer direction is nipped by the discharge roller 69. Thereafter, the discharge roller 69 is rotated in the opposite direction, and the recording sheet P is transferred in the opposite direction. At this time, the leading edge of the recording sheet P in the transfer direction is not guided to the sheet transfer path 64, but is guided to the invert path 70. The recording sheet P is transferred along the invert path 70 by the transfer roller 71, and meets the sheet transfer path 64 at the upstream side of the process unit 62, more particularly, at the upstream side of the nip part between the photoconductive drum 72 and the transfer ring roller 77. By this, the second side of the recording sheet is opposed to the photoconductive drum 72 and is transferred, an image is recorded as described above, and the recording sheet is finally discharged to the paper output tray 61.

Figure 4:
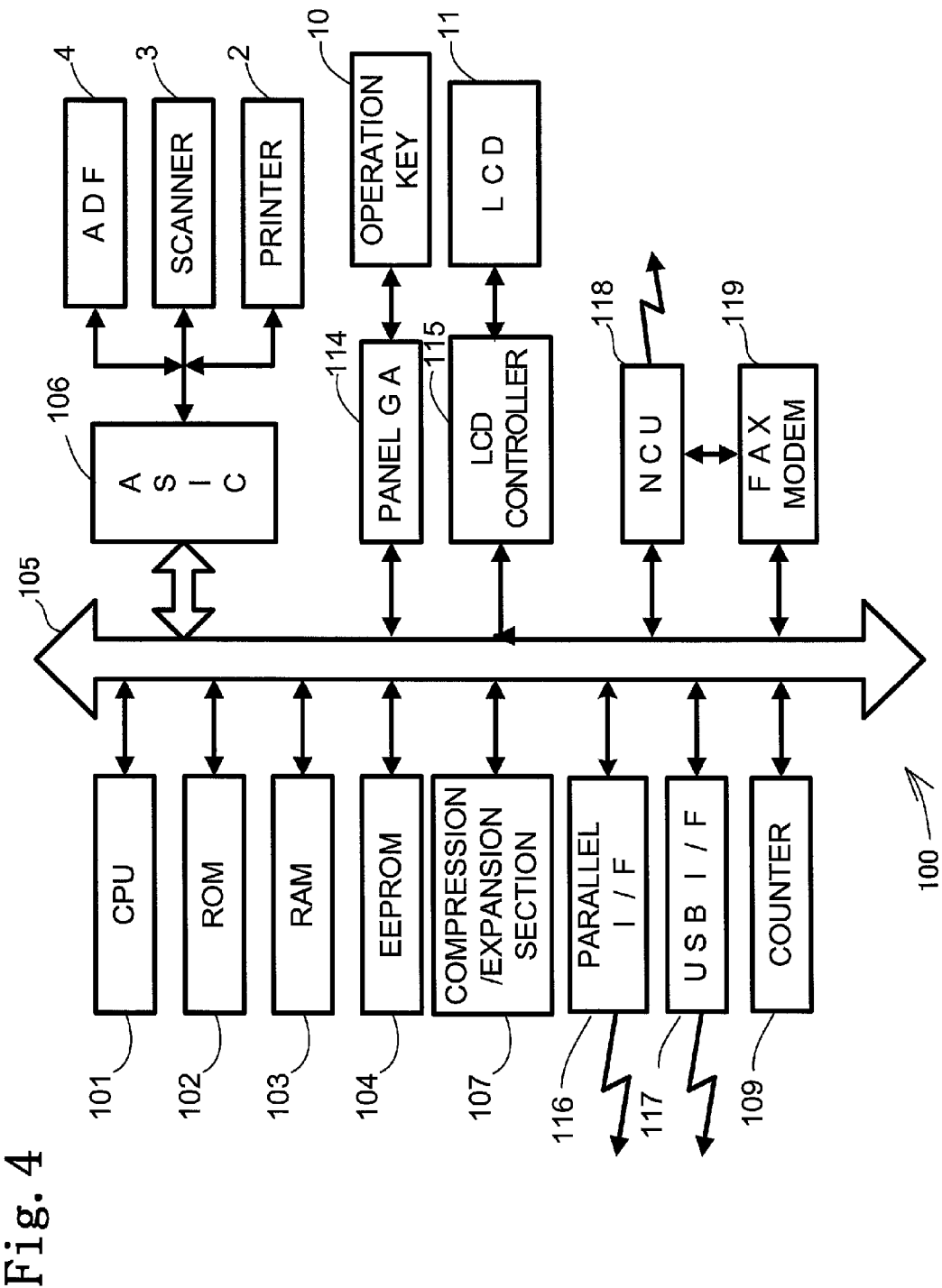
FIG. 4 is a block diagram showing a structure of a controller according to aspects of the invention.

Next, the controller 100 to control the operation of this MFD 1 will be described with reference to FIG. 4. Here, FIG. 4 is a block diagram showing the rough structure of the controller 100. As shown in the drawing, the controller 100 is constructed as a microcomputer mainly including a CPU (Central Processing Unit) 101, a ROM (Read Only Memory) 102, a RAM (Random Access Memory) 103, and an EEPROM (Electrically Erasable and Programmable ROM) 104 as an example of set data amount storage, and is connected to an ASIC (Application Specific Integrated Circuit) 106 through a bus 105.

A program in the form of computer-executable instructions for controlling the operations of the respective components constituting the MFD 1 is stored in the ROM 102. The RAM 103 is used as a storage area for temporarily recording various data used when the CPU 101 executes the program, or as an expansion area of the data or the program. Further, the RAM 103 is used as the image memory for temporarily storing the image data of the read document. In general, in a small type MFD, facsimile, or copying machine, in which the maximum size of a readable document is A4, 32 Mbyte RAM can be used, while in a large type one, 64 Mbyte RAM can be used.

Figure 5:
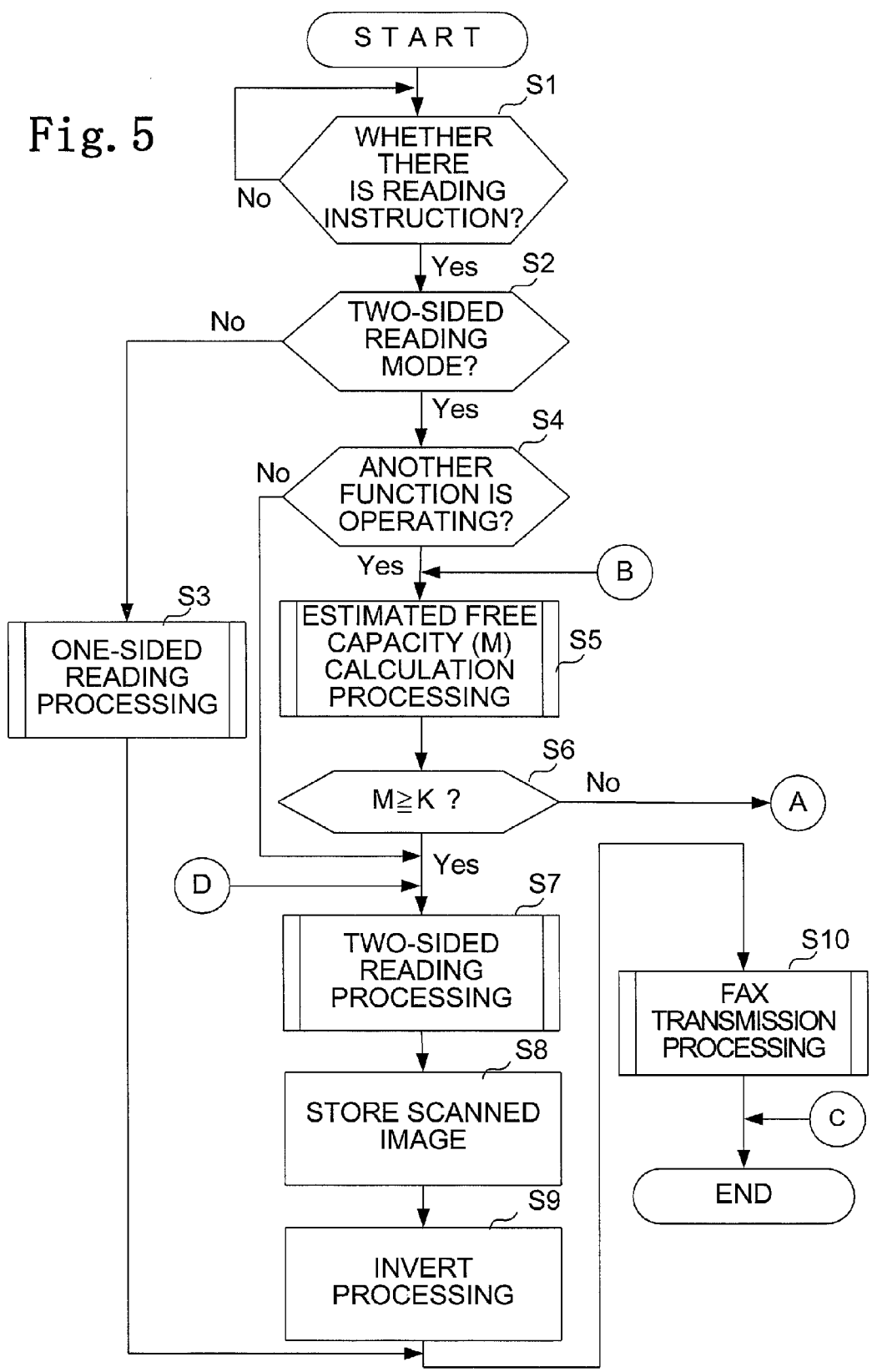
FIG. 5 is a flowchart for explaining an example of a procedure of processing executed by a CPU according to aspects of the invention.

Various data used for the processing in accordance with the program are stored in the EEPROM 104. For example, a threshold K used for the processing described in step S7 of FIG. 5 is stored in the EEPROM 104. This threshold K indicates a storage capacity (i.e., the amount of memory) required for a rotation process to be performed, in the case where two sides of the document are read, to cause the direction of the back side image (corresponding to the second side image) to coincide with the direction of the front side image (corresponding to the first side image). Also, the threshold K may be stored in a register of the CPU 101.

Also, table data (equivalent to a correspondence relation) in which the data amount previously set according to resolution or gradation (equivalent to specified estimate information) is tabulated and provides an example of a scanning condition, which can be set in the scanner 3 of the MFD 1. The table data is also stored in the EEPROM 104. In one aspect, the table data may be such that the set data amount corresponds to each resolution, or the set data amount corresponds to each gradation. Of course, the set data amount may correspond to the combination of the resolution and gradation. This table data is used for later described processing in step S503 of FIG. 6. Below, Table 1 shows an example of the table data in which the gradation is divided into monochrome (1 bit: binary value) and RGB full color (8 bits for each color of RGB: 256 values for each color of RGB), the resolution is divided into 6 stages of 100 to 600 dpi, and each is made to correspond to the set data amount. Although Table 1 shows an example of the data amount of a read image in BMP format corresponding to a resolution value, table data that corresponding to a resolution value in which an image data amount obtained by compressing a read image by JPG or the like may also be employed. Although Table 1 shows the set data amount of an A4 size document, the table data shown in Table 1 may be provided for each of plural rated sizes.

TABLE 1

| Resolution (dpi) | Set data amount (BMP/Mbyte) | |
| --- | --- | --- |
| | Monochrome | Color (RGB) |
| 100 | 0.1 | 2.8 |
| 200 | 0.5 | 12.0 |
| 300 | 1.0 | 25.5 |
| 400 | 1.9 | 50.0 |
| 500 | 3.0 | 72.0 |
| 600 | 3.8 | 102 |

The CPU 101 controls peripheral control devices constituting the controller 100 or controlled equipment to be controlled by the controller 100. The CPU 101 causes the program stored in the ROM 102 and data stored in the RAM 103 or the EEPROM 104 to be read out, and an operation according to the program to be performed. That is, processing according to a procedure shown in the flowcharts of FIGS. 5 to 10 is executed. The CPU 101 can perform the functions of data amount estimation, rotation possible/impossible judgment, changing set values and control. It will be appreciated by one skilled in the art that although in the described aspects processing according to a specified program can be executed by the CPU 101, in other aspects processing executed by the CPU 101 is configured by a hard logic circuit such as an ASIC.

A compression/expansion section 107 is an integrated circuit, such as an LSI or VLSI, in which a compression circuit, an expansion circuit, an internal memory and the like are provided. The compression circuit sequentially performs at least an irreversible compression processing on image data of specified lines (for example, 8 lines) sequentially inputted to the compression/expansion section 107, and can be specifically configured to perform JPEG image compression processing. On the other hand, the expansion circuit sequentially expands the compressed image data inputted to the compression/expansion section 107. According to one aspect, although the compression/expansion of image data in the compression/expansion section 107 is made possible by a hard logic circuit such as an integrated circuit, according to another aspect a compression/expansion program can be employed to realize the compression processing or expansion processing performed in the compression/expansion section 107 such that the CPU 101 compresses or expands the image data by executing software.

The ASIC 106 is connected with the ADF 4, the scanner 3, and the printer 2. In accordance with instructions from the CPU 101, the ASIC 106 creates and transfers control signals for controlling the drive systems of the ADF 4, the scanner 3 and the printer 2 to the ADF 4, the scanner 3 and the printer 2, respectively. Of course, according to another aspect, without using the hard logic circuit such as the ASIC 106, the respective devices may be controlled based on a software program executed by the CPU 101.

The bus 105 is connected with a panel gate array (panel GA) 114 to control the various operation keys 10, such as a start button and a stop button, disposed on the operation panel 5 of the MFD 1. The panel gate array 114 detects the depression of the operation keys 10 and outputs specified code signals. A key code is assigned to each of the operation keys 10. When receiving a code signal indicating a specified key code from the panel gate array 114, the CPU 101 executes a control function in accordance with a specified key processing table. The key processing table is such that key codes and control function correspond to each other. The key processing table may be stored in, for example, the ROM 102 or the EEPROM 104.

In addition, a bus 105 is connected with an LCD controller 115 to control the liquid crystal display (LCD) 11. The LCD controller 115 causes the liquid crystal display 11 to display information relating to the operation of the printer 2 or the scanner 3, error information, set information and the like on the screen based on instructions from the CPU 101.

Also, the bus 105 is connected with a parallel interface 116 and a USB interface 117 for transmitting/receiving data to/from a computer (not shown) through a parallel cable or a USB cable. Further, the bus 105 can be connected with an NCU (Network Control Unit) 118 for realizing a facsimile function, and a MODEM 119.

Hereinafter, a transfer operation of a document Gn by the ADF 4 and a scanning operation of scanning images on two sides of the document Gn by the image scanner 22 will be described with reference to FIGS. 11 to 17. Here, FIGS. 11 to 17 are schematic views for explaining the document transfer operation executed by the ADF 4 at the time of scanning the document G. In the drawings, a side of the document Gn denoted by "1" is a first side which is first read in the two-sided scanning, and a side denoted by "2" is a second side which is later read, and the first side and the second side correspond to the front and back sides. Although the scanner 3 can be used as the FBS and can use the ADF 4, since the use of the FBS is not relevant to the invention, the detailed description thereof will be omitted. Two-sided scanning occurs when the image scanner 22 reads images on two sides of the document Gn in the transfer process of the document Gn by the ADF 4.

In the case where the image of the document Gn is read by using the ADF 4, the document cover 6 needs to be closed to the document placing table 7. The opening/closing of the document cover 6 is detected by a sensor or the like provided on the document placing table 7, and a control signal generated so that when the document cover 6 is closed, the ADF 4 can be used. Then, the document Gn to be read is placed on the input tray 30. The document Gn is placed on the input tray 30 such that the scanning side (first side) becomes the upper side, and is laying face-up. It will be appreciated that the number of the documents Gn to be scanned may be one or more. For example, in the case where plural documents Gn of the same size are to be scanned, the documents may be placed on the input tray 30 such that the first side of the first document G1 points upwards, that is, they are face-up stacked and aligned.

When a scanning start instruction is inputted, a motor is driven, and the pickup roller 33, the separation roller 34, the feed rollers 35A, 35B, 35C and 35D, the paper discharge roller 36, and the reversible roller 43 are rotationally driven at specified timings. In addition, the arm 29 is lowered, and the pickup roller 33 makes pressing contact with the document G1 on the input tray 30. The document G1 at the uppermost position which directly receives the rotational force of the pickup roller 33 and the separation roller 34 is first separated and is sent to the transfer path 32. The fed document Gn is guided along the transfer path 32 and is transferred to the scanning position, and the document Gn is scanned by the image scanner 22 which is on standby below the scanning position. The document Gn is discharged to the output tray 31 after scanning has been completed. In the scanning operation as stated above, the transfer path of the document Gn is different between the case where one-side of the document Gn is scanned and the case where two-sides of the document are scanned. Whether one side of the document Gn is scanned or two sides is determined based on whether a one-sided scanning mode or a two-sided scanning mode was previously set before the scanning start instruction was inputted. The setting information of the scanning mode is stored in the RAM 103 or the register of the CPU, and is held for a certain time before and after scanning.

Hereinafter, two-sided scanning of the document Gn will be described. When the one-sided scanning mode is set in the MFD 1, the document G1 fed from the input tray 30 is U-turned and transferred along the transfer path 32 with the first side being opposite the scanning position, and after the image of the first side is read, the document is discharged to the output tray 31. Since one-sided scanning as stated above is a well-known operation, the detailed description thereof will be omitted.

Figure 11:
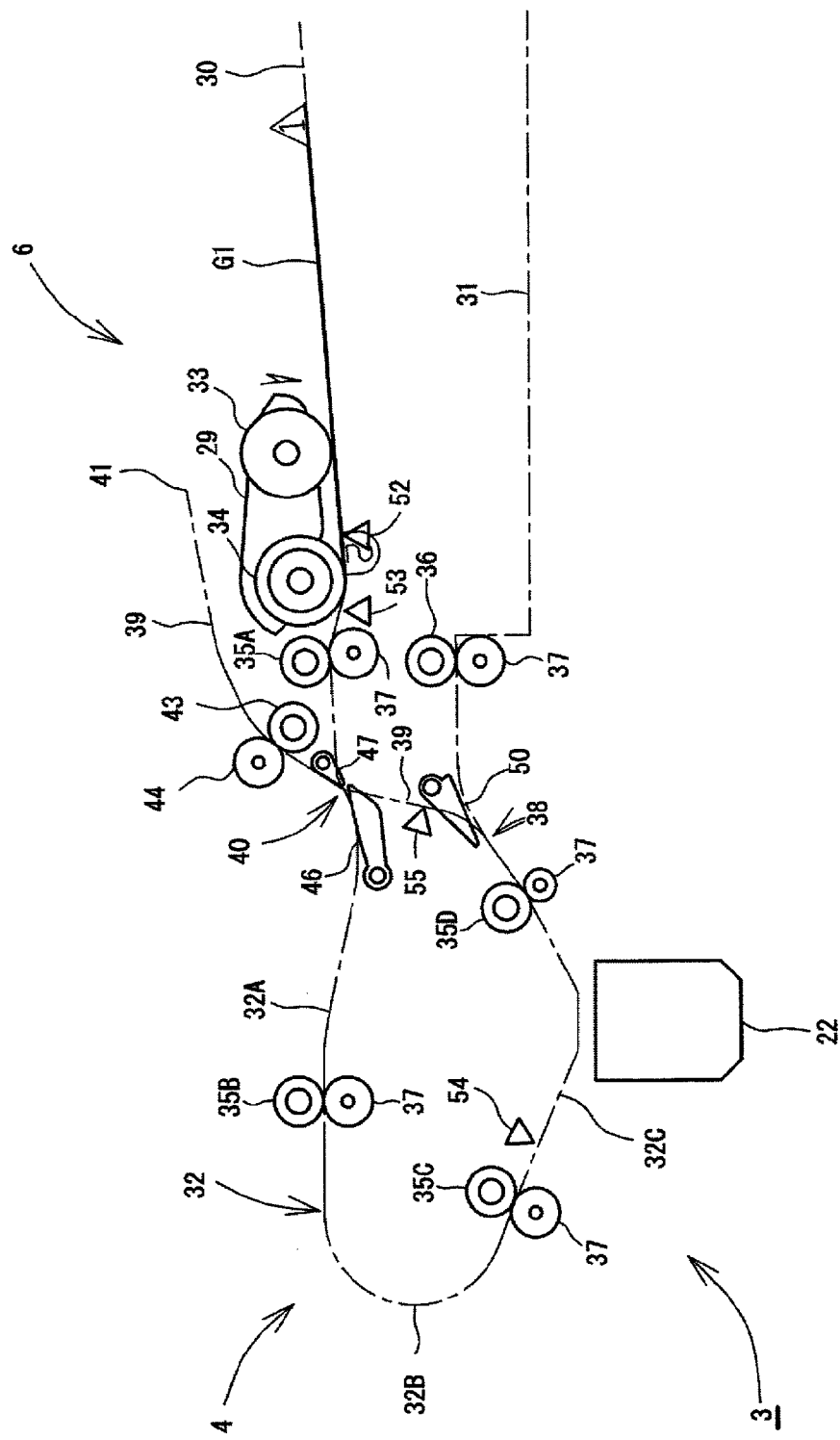
FIG. 11 is a schematic view for explaining a document transfer operation at the time of two-sided scanning according to aspects of the invention.

As shown in FIG. 11, before the document Gn is fed, the guide flap 50 is located at the position where the transfer path at the connection position 38 is continuous with the output tray 31 side from the scanning position side of the transfer path 32. The guide flap 46 is located at the position where the transfer path at the intersection position 40 is continuous with the scanning position side from the input tray 30 side of the transfer path 32, and the guide flap 47 is located at the position where the transfer path at the intersection position 40 is continuous with the scanning position side of the transfer path 32 from the end 41 side of the bidirectional path 39.

When the scanning start instruction is inputted, the controller 100 causes the first front sensor 52 to detect whether the document Gn is placed on the input tray 30. At this time, when judging that the document Gn is not placed on the input tray 30, the controller 100 performs an error display "there is no document" on the liquid crystal display 11 of the MFD 1. When judging that the document Gn is placed on the input tray 30, the controller 100 drives the motor.

When the motor is driven, the driving force is transmitted to the arm 29, and the arm 29 is lowered. This causes the pickup roller 33 to make pressing contact with the document G1 on the input tray 30. The driving force of the motor is also transmitted to the pickup roller 33 and the separation roller 34, and the pickup roller 33 and the separation roller 34 are rotated in the feed direction, so that the document G1 is sent to the transfer path 32. In the case where plural documents Gn are placed on the input tray 30, it is possible that, together with the document G1 at the uppermost position, a document G2 below document G1 is sent. However, the document G2 is stopped by a friction pad (not shown) provided at a position opposite the separation roller 34. In this way, the document G1 is fed to the transfer path 32.

On the transfer path 32, the driving force from the motor is transmitted to the feed rollers 35A, 35B, 35C and 35D and the paper discharge roller 36, and the respective rollers are rotated to transfer the document Gn from the upstream side of the transfer path 32 to the downstream side, that is, in the transfer direction. The document G1 fed to the transfer path 32 from the input tray 30 is nipped by the feed roller 35A and the pinch roller 37 and the rotation force is transmitted, so that it is transferred to the intersection position 40 along the transfer path 32. Also, the document G1 is fed to the transfer path 32, so that the second front sensor 53 is turned on.

Figure 12:
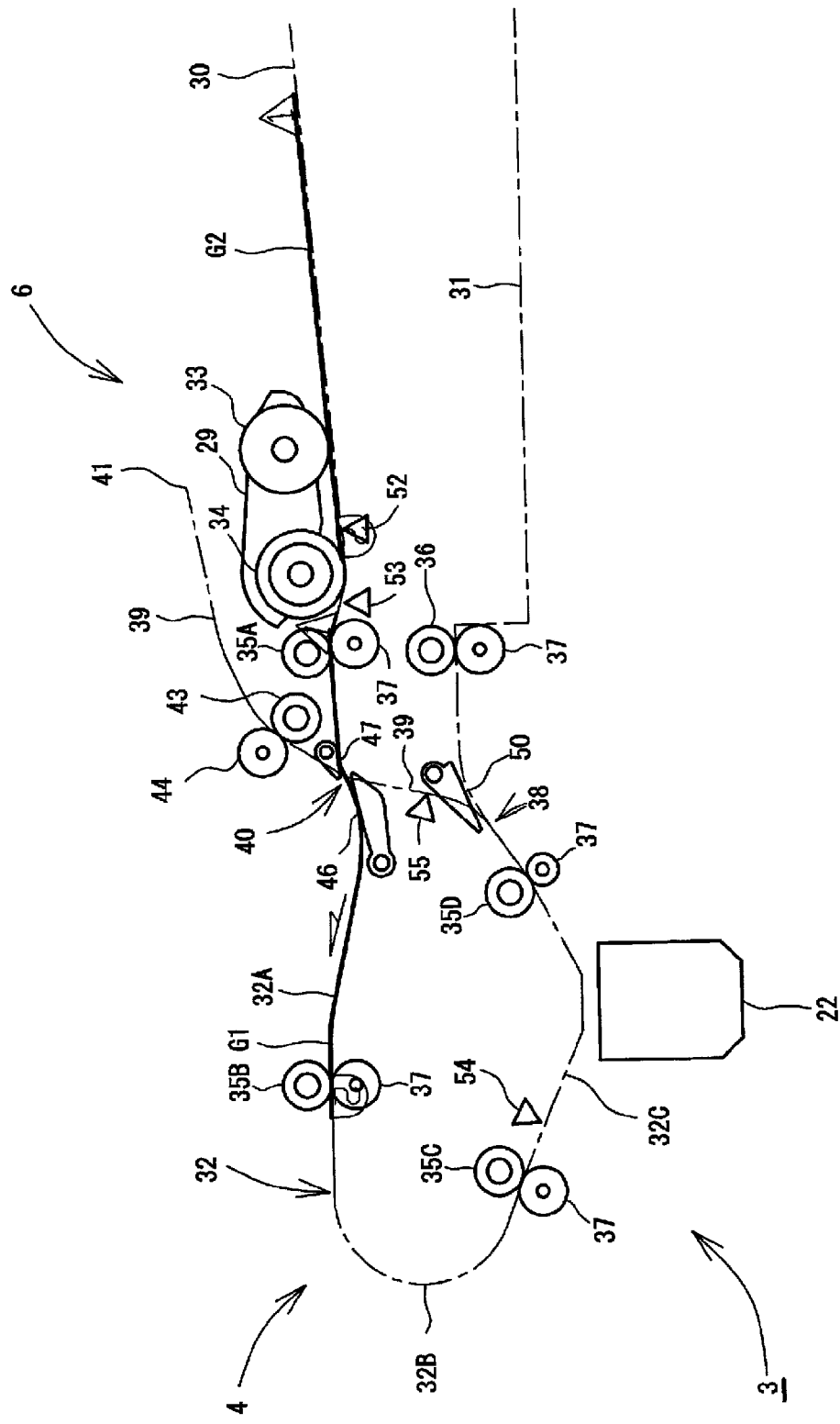
FIG. 12 is a schematic view for explaining the document transfer operation at the time of two-sided scanning according to aspects of the invention.

Since the guide flap 47 closes the transfer path from the input tray 30 side of the transfer path 32 to the intersection position 40, the document G1 transferred to the intersection position 40 comes in contact with the guide flap 47. As shown in FIG. 12, the guide flap 47 is pushed by the document G1 transferred along the transfer path 32 and is rotated to the left in the drawing. In this manner, the transfer path from the input tray 30 side of the transfer path 32 to the scanning position side becomes continuous, and the transfer path to the end 41 side of the bidirectional path 39 is closed. Also, the transfer path to the connection position 38 side of the bidirectional path 39 is closed by the guide flap 46. Accordingly, the document G1 having reached the intersection position 40 from the input tray 30 side of the transfer path 32 is guided by the guide flap 46 and the guide flap 47, and is transferred to the scanning position side of the transfer path 32 without entering in either direction of the bidirectional path 39.

Figure 13:
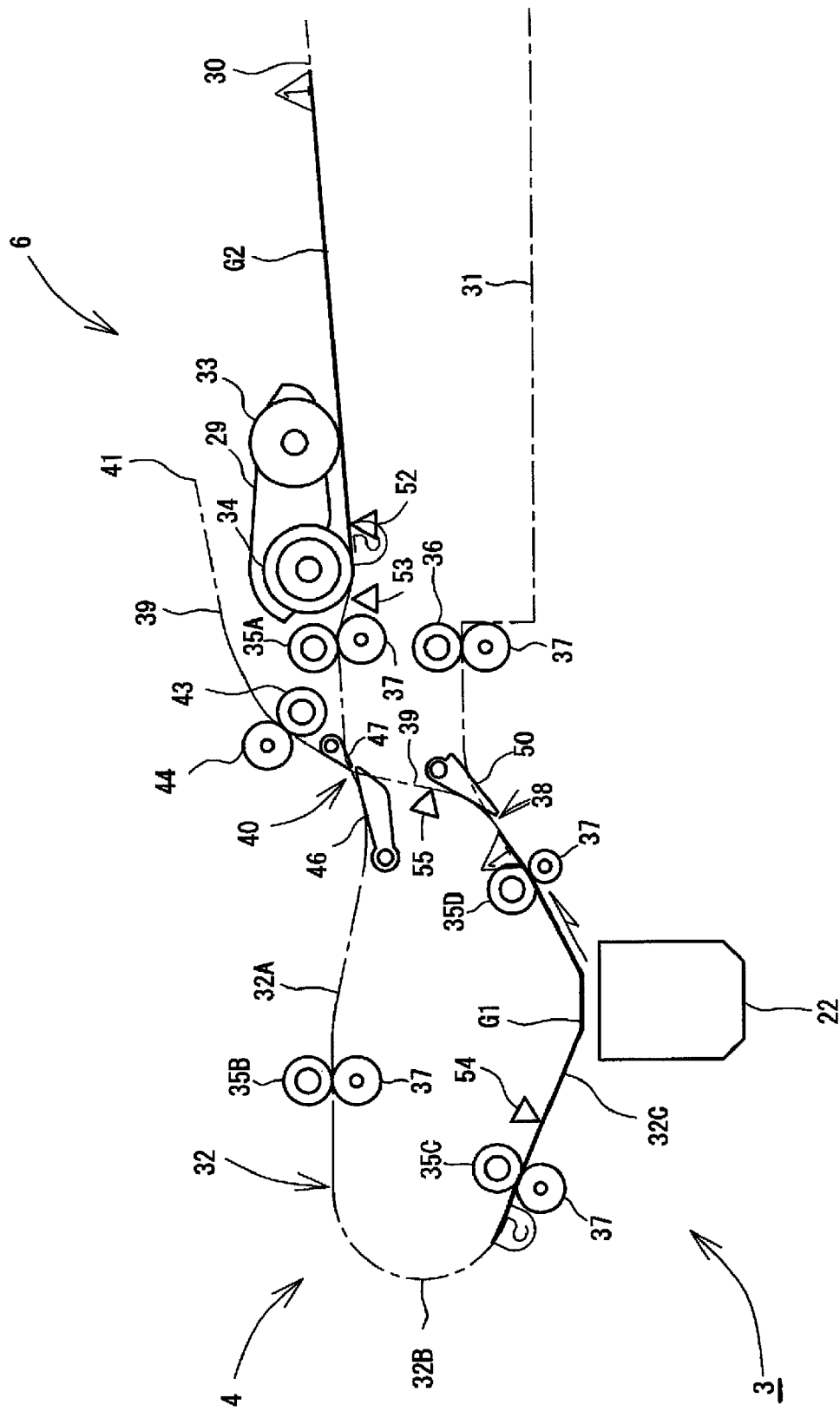
FIG. 13 is a schematic view for explaining the document transfer operation at the time of two-sided scanning according to aspects of the invention.

As shown in FIG. 13, the document G1 is directed downward by the curved part 32B of the transfer path 32 and is transferred, and the rear sensor 54 detects the leading edge of the document G1 in the transfer direction and is turned on. Since the leading edge of the document G1 in the transfer direction reaches the scanning position after a specified time has passed since it was detected by the rear sensor 54, when the leading edge of the document G1 in the transfer direction reaches the scanning position, the controller 100 actuates the image scanner 22, and scans the first side of the document G1. The document G1 passes through the scanning position while the first side opposes the image scanner 22, and the image of the first side of the document G1 is read by the image scanner 22. When detecting the trailing edge of the document G1 in the transfer direction, the rear sensor 54 is turned off. After a specified time has passed since the rear sensor 54 was turned off, the controller 100 ends scanning of the first side of the document G1 by the image scanner 22. The image data of the first side of the document G1 read by the image scanner 22 is stored in a specified area of the RAM 103.

Figure 14:
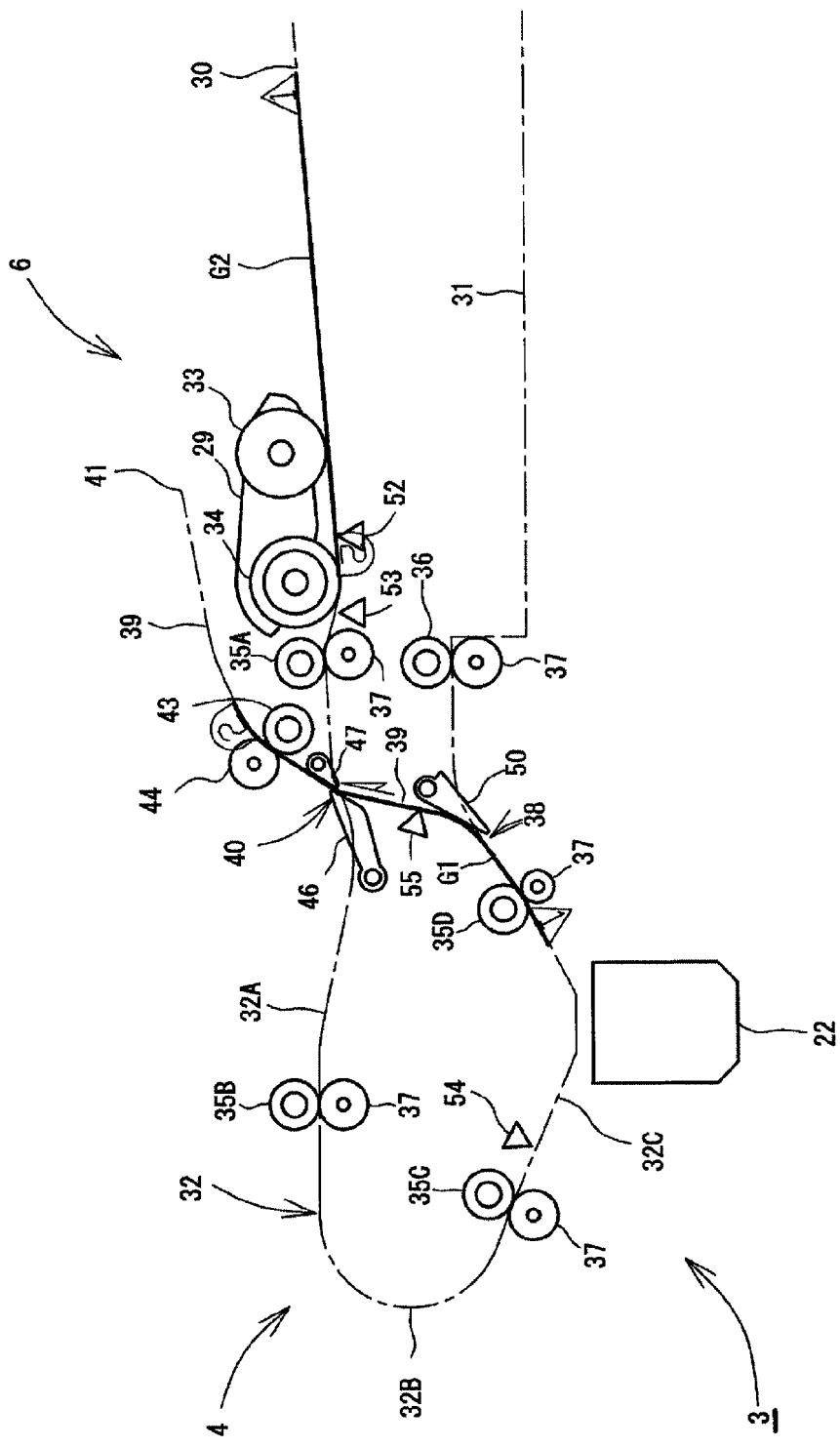
FIG. 14 is a schematic view for explaining the document transfer operation at the time of two-sided scanning according to aspects of the invention.

As shown in FIG. 14, the guide flap 50 receives the driving force from the motor, and before the leading edge of the document G1 in the transfer direction reaches the connection position 38, the position of the guide flap 50 is changed to guide the document G1 to the bidirectional path 39. The leading edge of the document G1 in the transfer direction, the first side of which has been read, is guided by the guide flap 50 into the bidirectional path 39 from the transfer path 32 at the connection position 38. The sensor 55 detects the leading edge of the document G1 in the transfer direction that enters the bidirectional path 39 and is turned on.

Since the guide flap 46 closes the transfer path from the bidirectional path 39 to the intersection position 40, the leading edge of the document G1 in the transfer direction having entered the bidirectional path 39 comes in contact with the guide flap 46 when reaching the intersection position 40. As shown in FIG. 14, the guide flap 46 is pushed upward by the leading edge of the document G1 in the transfer direction transferred along the bidirectional path 39 and is rotated. In this manner, the transfer path from the connection position 38 side of the bidirectional path 39 to the end 41 side of the bidirectional path 39 becomes continuous, and the transfer path to the scanning position side of the transfer path 32 is closed. Also, the transfer path to the input tray 30 side of the transfer path 32 is closed by the guide flap 47. Accordingly, the leading edge of the document G1 in the transfer direction having reached the intersection position 40 from the connection position 38 side of the bidirectional path 39 is guided by the guide flap 46 and the guide flap 47, and is transferred to the bidirectional path 39 without entering the transfer path 32. The leading edge of the document G1 in the transfer direction is nipped by the reversible roller 43 and the pinch roller 44, and is transferred to the end 41 side along the bidirectional path 39 by the rotation of the reversible roller 43 in the draw-in direction.

Figure 15:
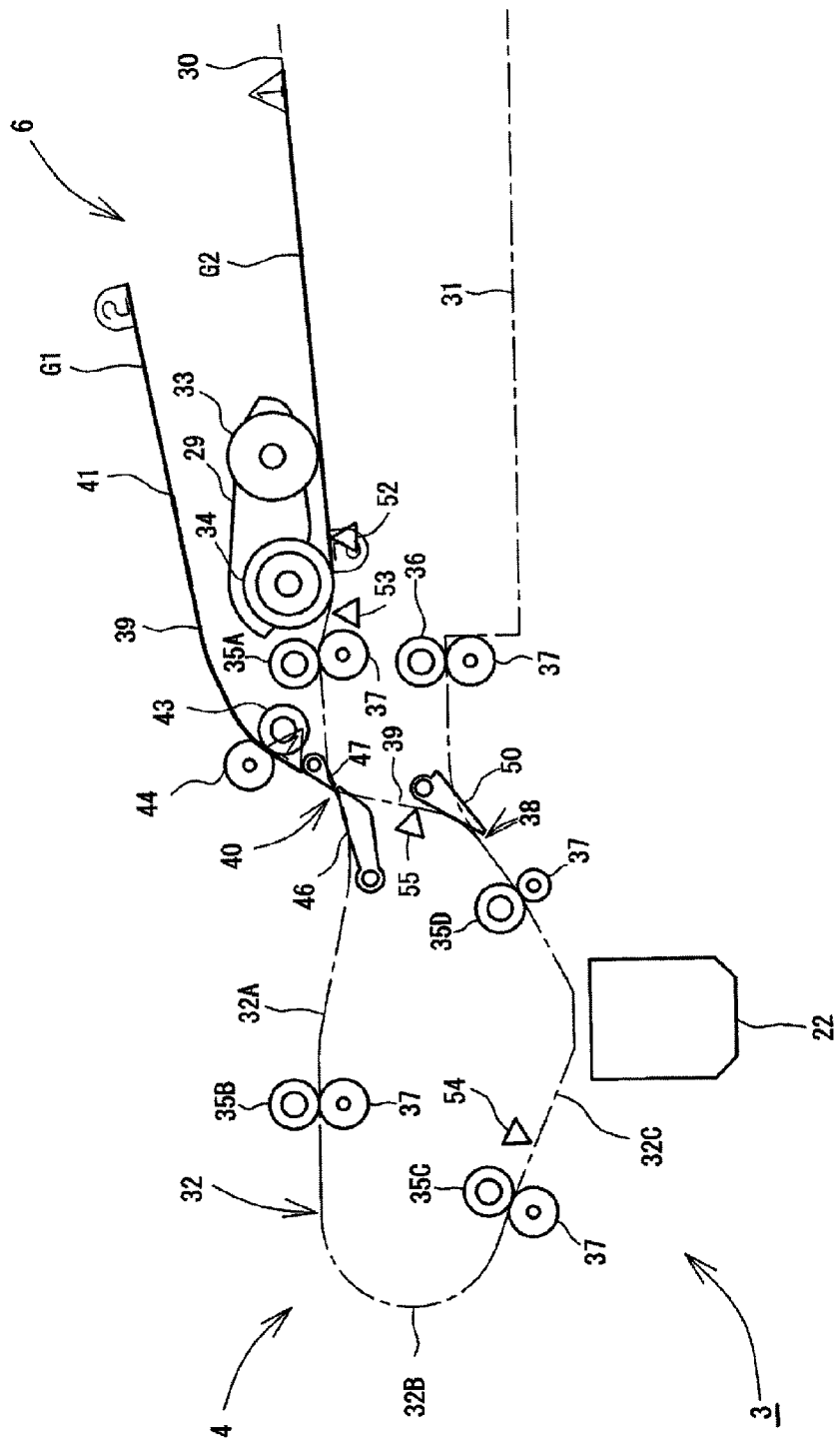
FIG. 15 is a schematic view for explaining the document transfer operation at the time of two-sided scanning according to aspects of the invention.

As shown in FIG. 15, after the trailing edge of the document G1 in the transfer direction passes the intersection position 40 of the bidirectional path 39 and completely enters the end 41 side, the controller 100 changes the rotation of the motor. The sensor 55 detects the trailing edge of the document G1 transferred along the bidirectional path 39 and is turned off, and after a specified time has passed, the trailing edge of the document G1 passes through the intersection position 40. Accordingly, by the detection signal of the sensor 55 and the count of the transfer distance or transfer time by the feed roller 35D and the reversible roller 43, the controller 100 judges that the trailing edge of the document G1 in the transfer direction has passed the intersection position 40 of the bidirectional path 39 and completely entered the end 41 side. The rotation of the motor is changed, so that the document G1 nipped by the reversible roller 43 and the pinch roller 44 and protruded from the end 41 is returned to the intersection position 40.

When a part of the document G1 protrudes from the end 41 of the bidirectional path 39 outside the ADF 4, a portion of the protruding document G1 is supported by the document support section 42. When the document G1 passes through the intersection position 40 and is separated from the guide flap 46, the guide flap 46 is rotated downward.

Figure 16:
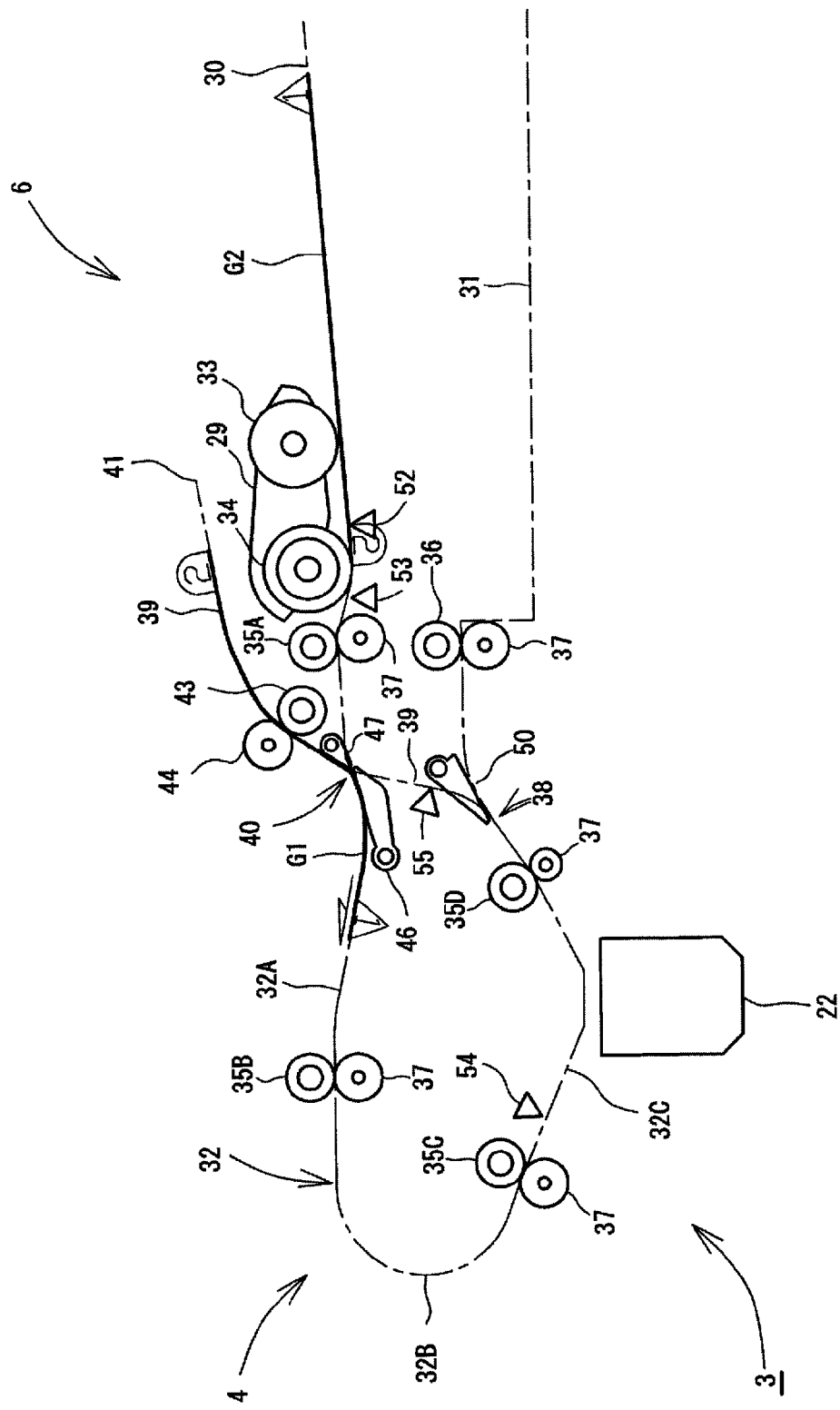
FIG. 16 is a schematic view for explaining the document transfer operation at the time of two-sided scanning according to aspects of the invention.

As shown in FIG. 16, the document G1 returned from the bidirectional path 39 comes in contact with the guide flap 46 at the intersection position 40. The guide flap 46 is restrained so that it does not rotate downward from the position shown in FIG. 16. Accordingly, the transfer path from the end 41 side of the bidirectional path 39 to the scanning position side of the transfer path 32 becomes continuous, and the transfer path to the connection position 38 side of the bidirectional path 39 is closed. Besides, the guide flap 47 closes the transfer path to the input tray 30 side of the transfer path 32. Accordingly, the document G1 is guided by the guide flap 46 and the guide flap 47, and is transferred from the end 41 side of the bidirectional path 39 to the scanning position side of the transfer path 32 without entering the connection position 38 side of the bidirectional path 39 and the input tray 30 side of the transfer path 32. The document G1 is returned from the bidirectional path 39 to the upstream side of the scanning position of the transfer path 32, and the document G1 is resent along the transfer path 32 in a state where the leading edge and the trailing edge are reversed from a state in which the document was first transferred along the transfer path 32. The document G1 is transferred along the transfer path 32 while the second side opposes the scanning position.

Figure 17:
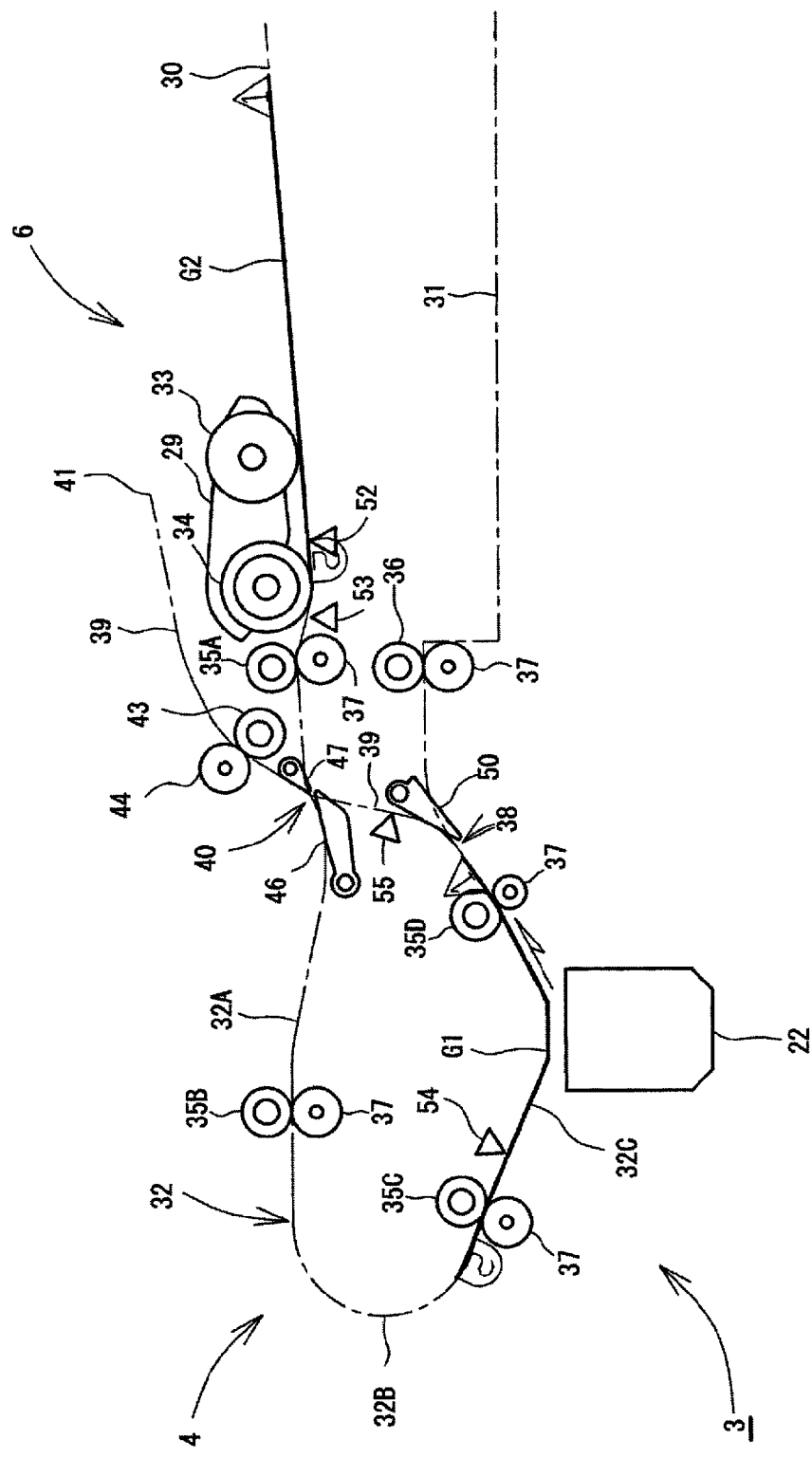
FIG. 17 is a schematic view for explaining the document transfer operation at the time of two-sided scanning according to aspects of the invention.

The leading edge of the document G1 in the transfer direction is detected by the rear sensor 54, and when the leading edge in the transfer direction reaches the scanning position, as shown in FIG. 17, the controller 100 causes the image scanner 22 to scan the second side of the document G1. The leading edge of the document G1 in the transfer direction after the second side has been read is guided by the guide flap 50 into the bidirectional path 39 from the transfer path 32 at the connection position 38. The trailing edge of the document G1 in the transfer direction is detected by the rear sensor 54, and when the trailing edge reaches the scanning position, the controller 100 ends the scanning of the second side of the document G1 by the image scanner 22. The image data of the second side of the document G1 read by the image scanner 22 is stored in the specified area of the RAM 103.

The leading edge of the document G1 in the transfer direction having reached the intersection position 40 pushes up the guide flap 46 similarly to FIG. 15, and enters the end 41 side of the bidirectional path 39 at the intersection position 40. Then, similarly to FIG. 16, after the trailing edge of the document G1 in the transfer direction has passed the intersection position 40 of the bidirectional path 39 and completely entered the end 41 side, the controller 100 changes the rotation of the motor to rotate the reversible roller 43 in the returning direction, and returns the document G1 to the intersection position 40. The document G1 returned from the bidirectional path 39 is guided by the guide flap 46 and the guide flap 47, and is transferred from the end 41 side of the bidirectional path 39 to the scanning position side of the transfer path 32. In this manner, the document G1 is resent along the transfer path 32 in a state where the leading edge and the trailing edge are again reversed, that is, in a state where the document is first fed to the transfer path 32.

Thereafter, the document G1 passes through the scanning position while the first side opposes the scanning position, is guided by the guide flap 50 to the output tray 31 side at the connection position 38, and is discharged to the output tray 31 by the discharge roller 36 while the first side points downward. In the case where the next document G2 is set on the input tray 30, that is, when the first front sensor 52 is on, the controller 100 rotates the separation roller 34 in the feed direction. In this manner, the document G2 on the input tray 30 is fed to the transfer path 32, and similarly to the foregoing, the two sides of the document G2 are scanned. In the case where the next document does not exist on the input tray 30, the controller 100 ends the scanning.

According to this aspect, although the operation of the two-sided scanning by the image scanning apparatus 1 has been described on the assumption that the documents are discharged to the output tray 31 in the state where the order of the plural documents Gn placed on the input tray 30 is maintained, in the case where it is unnecessary that the order of the documents Gn placed on the input tray 30 and the order of the documents Gn discharged to the output tray 31 conform to each other, after the document Gn is transferred while the second side of the document Gn opposes the scanning position, the document Gn is prevented from entering the bidirectional path 39, but is transferred to the output tray 31 side at the connection position 38, and the document Gn may be discharged to the output tray 31. Although the order of the documents Gn is not kept in the output tray 31, since the final transfer can be omitted, the time required for scanning two sides of the document Gn can be shortened.

Next, an example of a procedure executed by the CPU 101 in a facsimile mode will be described with reference to flowcharts of FIGS. 5 to 10. S1, S2, . . . , Sn in FIGS. 5 to 10 denote labels for the steps of the procedure. The following process is started from step S1 in a state where a document G is set on the input tray 30, and the facsimile mode and two-sided scanning mode are previously set. Incidentally, the process described below can be applied when image data from two sides of the document G is read in a scanner mode or a copy mode.

In this MFD 1, the facsimile mode key of the operation panel 5 is depressed, and then, a two-sided scanning function displayed on the liquid crystal display 11 is selected, so that facsimile communication of the document Gn having images on two sides becomes possible. In this state, first, in the flowchart of FIG. 5, it is judged at step S1 whether a scanning instruction is inputted. Specifically, the judgment at the step S1 is executed in accordance with whether the CPU 101 detects the presence/absence of the start signal generated when the start button on the operation panel 5 is depressed.

Next, at step S2, it is judged whether the two-sided scanning mode is set. The judgment can be performed by referring to the set information stored in the register of the CPU 101 or the like. At the step S2, in the case where it is judged that the two-sided scanning mode is not set (No side of S2), after a one-sided scanning process is performed at step S3, the process proceeds to step S10. Incidentally, at the step S3, the document Gn is transferred from the input tray 30 through the transfer paths 32A, 32B and 32C to the output tray 31 without passing along the bidirectional path 39, and the processing to cause the image scanner 22 to read the front side image of the document Gn is executed in the transfer process. The front side image read in this way is transmitted to the transmission partner previously specified at step S10.

On the other hand, in the case where it is judged at the step S3 that the two-sided scanning mode is set, the process proceeds to step S4. At this step S4, it is judged whether another function of the MFD 1 is operating, that is, whether a process by another function is being executed. Here, another function is a facsimile reception function, a copy function, a print function or the like, and the process executed by these is a facsimile reception process to transfer and store the received image data in the RAM 103, an image recording process to record an image on a medium to be recorded based on the scanning image once stored in the RAM 103, a print process to record the image based on the print data on a medium to be recorded while the print data transferred from the PC or the like is spooled in the RAM 103. Each of these processes uses the RAM 103. In the case where it is judged at the step S4 that another function is not operating, since it is conceivable that the RAM 103 has a sufficient free capacity to perform the process (invert process) of rotating the back side image, a setting change process (S603 etc.) is not performed, and the process proceeds to step S7. When it is judged at the step S4 that another function is operating, the process proceeds to step S5. Although a process example will be described in which processing subsequent to the step S5 is executed in the case where another function is operating, the processing of the step S4 is not necessarily required, and the processing subsequent to the step S5 may be executed irrespective of the operation of another function.

When it is judged at the step S4 that another function is operating, the process proceeds to the step S5. Here, the CPU 101 executes a process (estimated free capacity calculation process) to calculate an estimated free capacity M of the RAM 103 at the time when the image data (front side image and the back side image) read during two-sided scanning process (S7) would be stored in the RAM 103. In detail, the estimated free capacity calculation process is executed by the CPU 101 in accordance with the procedure of S501 to S504 shown in the flowchart of FIG. 6.

Figure 6:
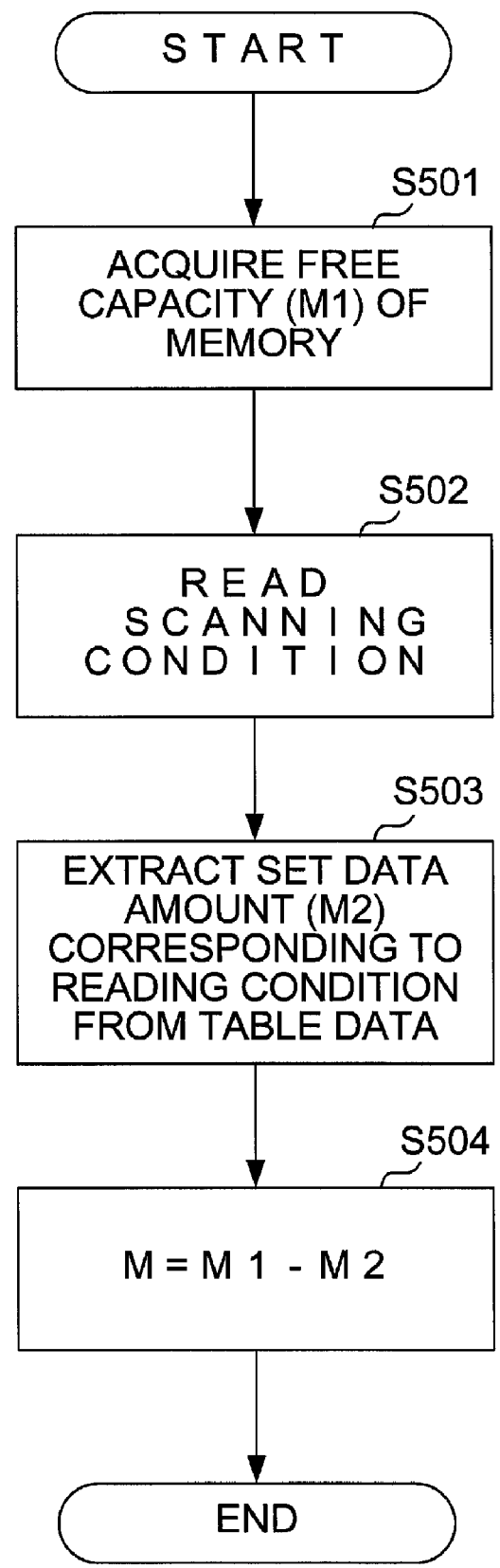
FIG. 6 is a flowchart for explaining an example of a procedure of free capacity estimation processing executed by the CPU according to aspects of the invention.

That is, at step S501 of FIG. 6, the free or available capacity M1 (corresponding to possible storage capacity) of the RAM 103 at the present time is acquired by the CPU 101. After the free capacity of the RAM 103 is acquired, the scanning condition of the scanner 3 is read out from the register of the CPU 101 (S502). In this aspect, the scanning condition includes an initial set value of resolution and an initial set value of gradation which are read. At step S503, a set data amount M2 corresponding to the scanning condition read at step S502 is extracted from the table data shown in Table 1 by the CPU 101. For example, at step S502, in the case where the initial set value of "300 dpi" for the resolution is read, and the initial set value of "monochrome" for the gradation is read, "1 Mbyte" is extracted as the set data amount M2 from the table data of Table 1. Thereafter, at step S504, the set data amount M2 is subtracted from the free capacity M1, and the subtracted value represents the estimated free capacity M.

When the estimated free capacity M is calculated at step S5, at step S6 of FIG. 5, a threshold K is read out from the EEPROM 104, and a process to compare the calculated estimated free capacity M with the threshold K is performed. In detail, it is judged whether the estimated free capacity M is larger than or equal to the threshold K. The judgment is made in order to judge whether the RAM 103 has sufficient free capacity to perform the rotation process of the back side image. Here, when it is judged that the estimated free capacity M is larger than or equal to the threshold K, the process proceeds to step S7, and the two-sided scanning process is executed. On the other hand, when it is judged that the estimated free capacity M is less than the threshold K, the process proceeds to step S601 of FIG. 7.

When the process proceeds to step S601 (FIG. 7), error information indicating that the rotation process of the back side image of the document G can not be performed is displayed on the liquid crystal display 11 by the CPU 101. At step S602, it is judged whether an instruction (scanning condition change instruction) to change the scanning condition is inputted. A user can operate the operation key 10 from the operation panel 5 to input the instruction. In the case where the scanning condition change instruction is inputted (Yes side of S602), the set value of the scanning condition may be changed to the set value inputted together with the instruction (S603). In the setting change process, at least one of the resolution and the gradation as the scanning condition or both will be changed. At step S603, the setting change process is performed only in the case where the set value smaller than the present set value is inputted as the set value. In the case where the inputted set value is larger than the present set value, a display may be performed to that effect and notification requesting re-input of a set value may be displayed.

After the setting change process at step S603 is performed, the steps subsequent to step S5 are repeatedly performed by the CPU 101. That is, at step S5, the estimated free capacity calculation process is performed again, and at step S6, the process to compare and judge the estimated free capacity M and the threshold K is performed. Also, at step S6, when it is judged again that the estimated free capacity M is less than the threshold K, the process subsequent to step S601 of FIG. 7 is again performed.

At step S602, the scanning condition change instruction is not inputted (No side of S602), and in the case where an interrupt instruction is inputted at step S604 (Yes side of S604), the scanning process of the document G and the facsimile transmission process are interrupted, and the series of processes are ended. If the interrupt instruction is not inputted (No side of S604), a judgment is made as to whether a standby instruction is inputted in step S605. When it is judged at step S605 that a standby instruction is inputted (Yes side of S605), at step S606 it is judged by the CPU 101 whether the RAM 103 is released from a process by another function. The judgment as stated above is performed by, for example, whether the activity ratio of the RAM 103 has become less than a specified ratio. When it is judged that the RAM 103 is released in step S606, the process proceeds to step S7 of FIG. 5. When there is no standby instruction inputted at S605, the process returns to step S602 and steps S602 to S605 are repeated until an instruction is inputted.

When the process proceeds to step S7, the transfer process of the document G and the scanning process of the front side image and the back side image of the document G are executed. Since the details of such processes have already been described, their description will be omitted here. The front side image and the back side image read at step S7 are stored in the RAM 103 by the CPU 101 in step S8. In detail, the image data read for every specified line is sequentially transferred to the RAM 103 and is sequentially stored, so that the image data for one page is stored in the RAM 103. At this time, when the image data read for the specified lines is transferred to the compression/expansion section 107, and the compressed image compressed at a specified compression ratio in the compression/expansion section 107 is stored in the RAM 103, the use efficiency of the RAM 103 can be raised.

Next, at step S9, the rotation process to rotate the back side image of the document G is executed by the CPU 101. As described above, in the case where the back side image is compressed, after the compressed image is once expanded in the compression/expansion section 107, the rotation process is executed. When the direction of the front side image and the direction of the back side image are aligned by the execution of the rotation process as stated above, the image data read in accordance with the specified facsimile transmission procedure is transmitted to the previously specified transmission partner in step S10.

As stated above, the estimated free capacity is obtained in step S5, and based on the estimated free capacity it is judged whether the rotation process can be performed in step S6.

Also, in the case where before the images on the two sides of the document are read, if it is judged that the rotation process can not be performed, the set value of the scanning condition can be reduced. Thus, the data amount of the images on the two sides to be read is decreased, and it becomes possible to increase the free capacity of the RAM 103. As a result, sufficient storage capacity to perform the rotation process can be realized.

Figure 7:
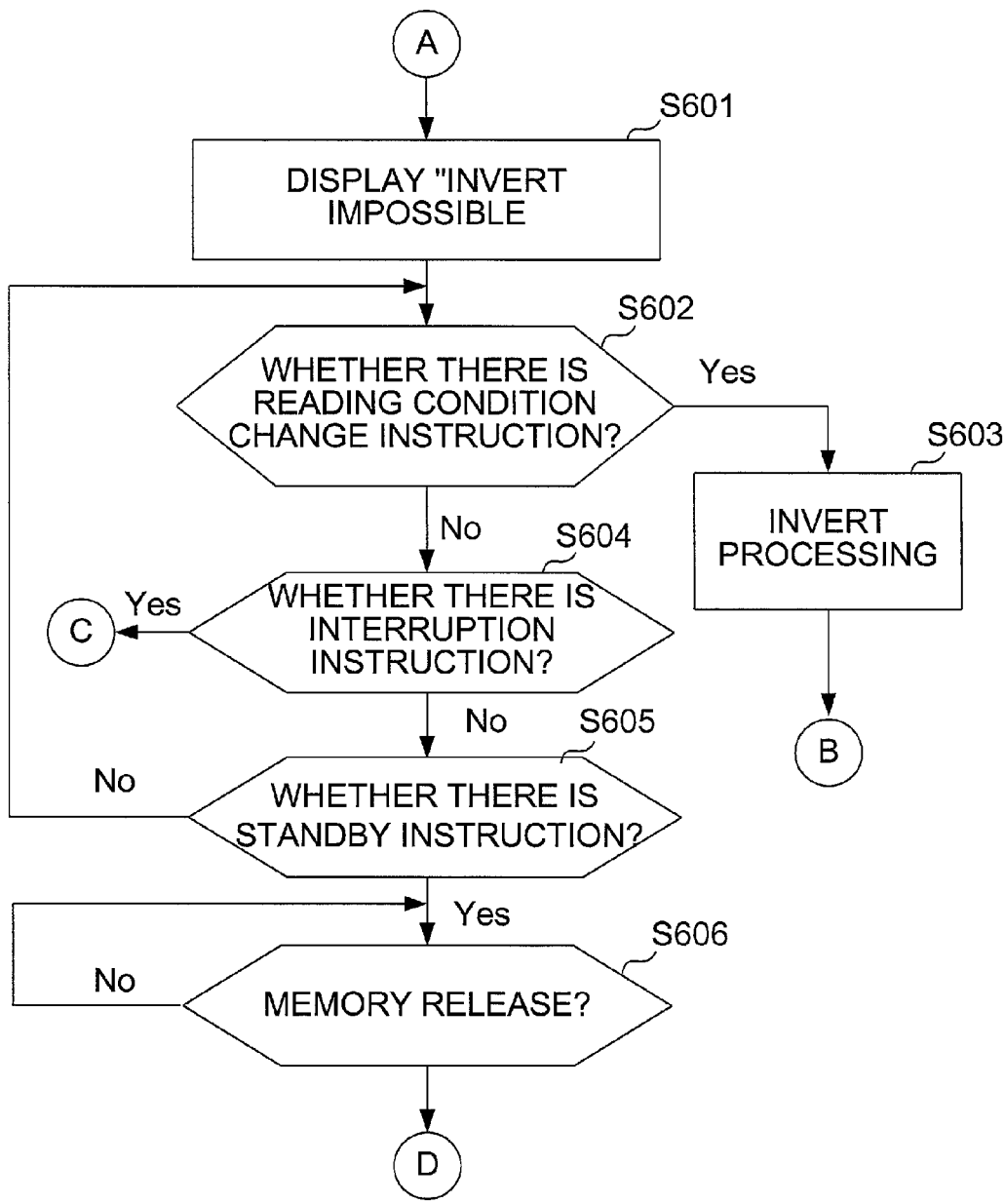
FIG. 7 is a flowchart for explaining an example of a process executed by the CPU according to aspects of the invention.
Figure 8:
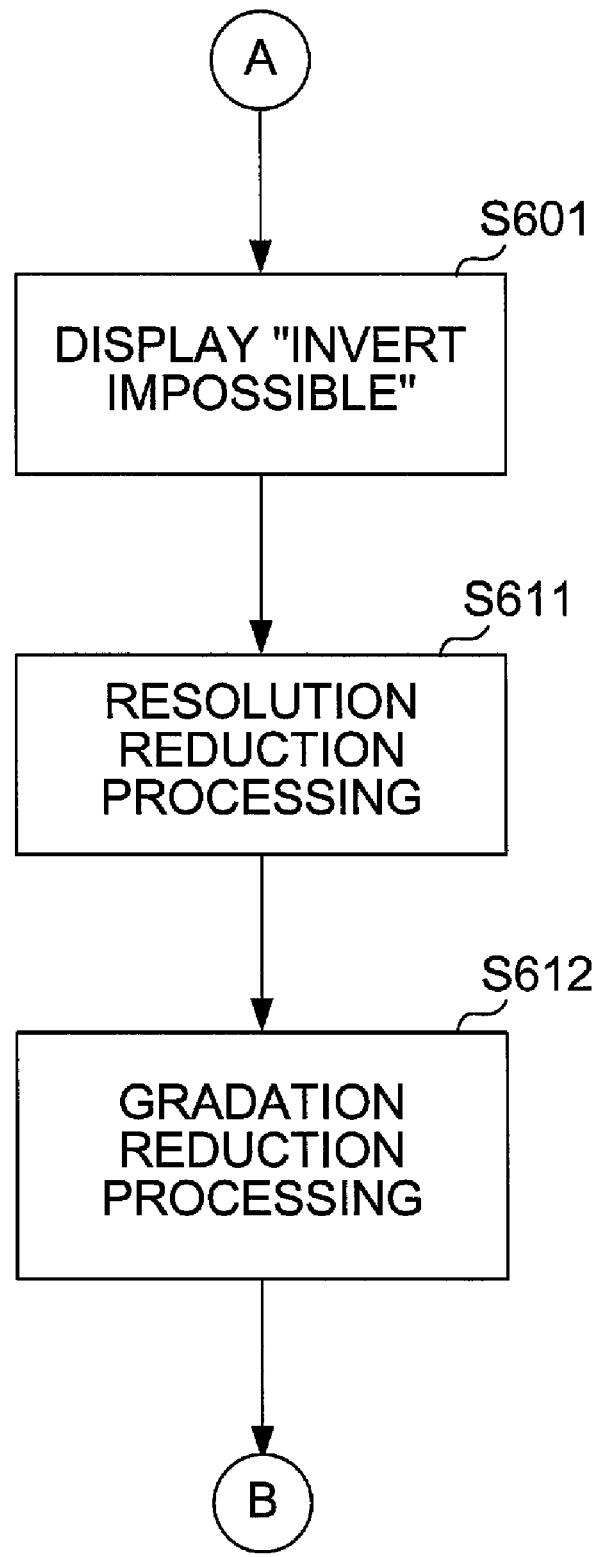
FIG. 8 is flowchart for explaining another example of a process executed by the CPU according to aspects of the invention.

Although the above described aspects provides in step S603 of the flowchart of FIG. 7 that the set value of the scanning condition, such as the resolution or gradation, can be changed to the value inputted by the user, the invention is not so limited. For example, in the case where the judgment of "No" is made at the comparison judgment of step S6 (FIG. 5), control shifts to FIG. 8. After displaying that the rotation process can not be performed at step S601, at step S611 a resolution reduction processing to reduce the set value of the resolution can be automatically executed, and at step S612 a gradation reduction processing to reduce the setting of the gradation can be automatically executed. It is conceivable to automatically reduce the resolution and the gradation based on a previously set reduction ratio (for example, −10%). It is sufficient if at least one of the resolution reduction process and the gradation reduction process is executed, and it is unnecessary to execute both the process.

Figure 9:
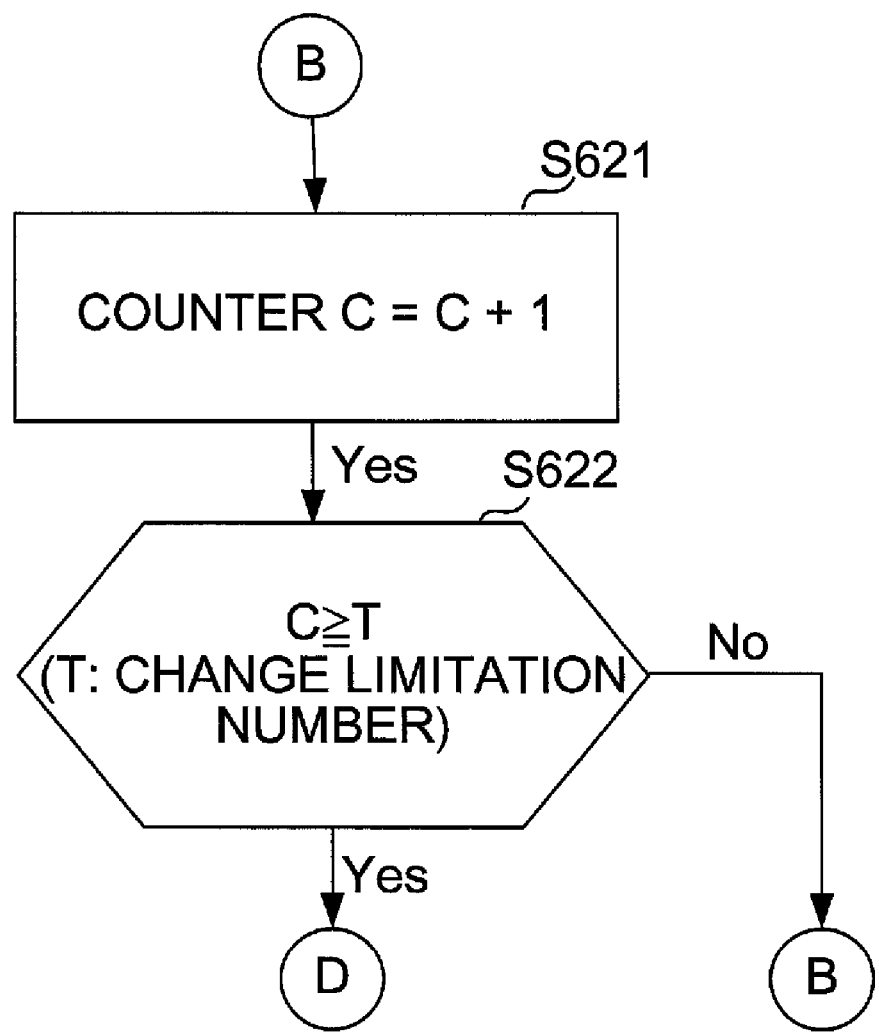
FIG. 9 is a flowchart for explaining another example of a process executed by the CPU according to aspects of the invention.
Figure 10:
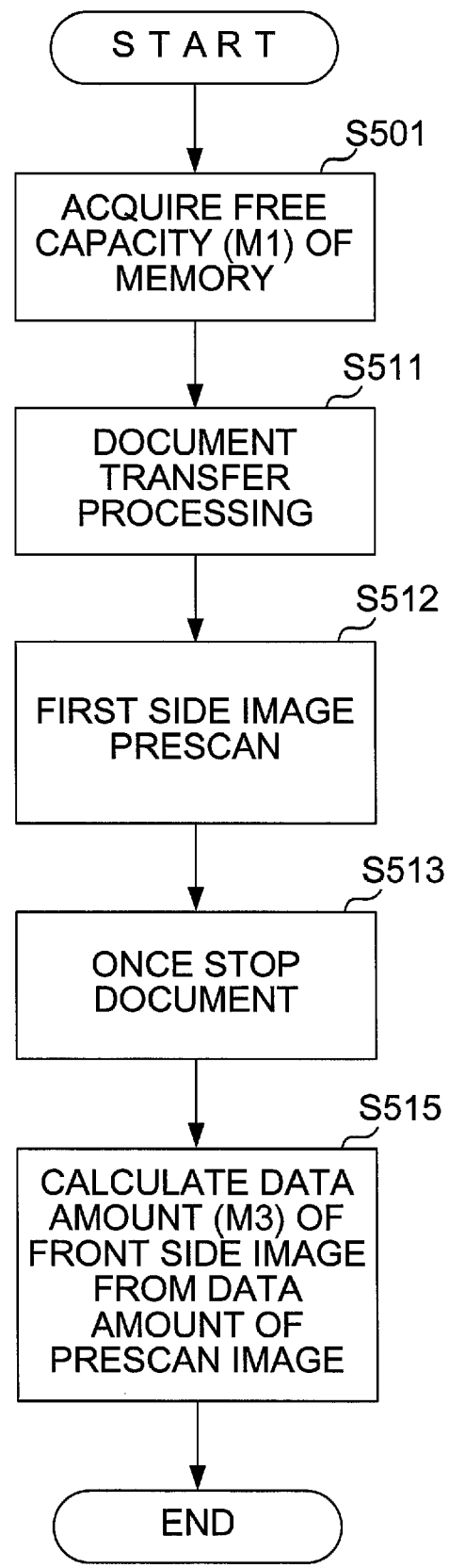
FIG. 10 is a flowchart for explaining another example of a procedure of free capacity estimation processing executed by the CPU according to aspects of the invention.

In order to avoid redundancy due to the plural repetitions of the process subsequent to the display process of step S601, a counter to count the number of times a setting is changed can be provided in the controller 100. As shown in FIG. 9, the number of times the setting is changed is counted after step S603 or step S612 (S621), and in the case where the count value is equal to or greater than the previously set change limitation, the process proceeds to step S7, and the two-sided scanning process is performed. In the case where the count value is less than the change limitation, the process subsequent to the step S5 is executed. Also, the counter is reset when the process subsequent to the step S7 is performed. As stated above, after changing the set value of the scanning condition, the process of steps S5 and S6 is not executed, and the process subsequent to step S7 is executed, so that it is possible to avoid redundant processing.

After the rotation process of step S9, it is desirable to judge whether the rotation process can be performed, and in the case where the rotation process can not be performed, the liquid crystal display 11 displays an indication to that effect. In accordance with the instruction input from the user, a process is performed to judge whether the facsimile transmission is performed without rotating the back side image, or whether the series of processes is interrupted.

In the above-described aspects, in the case where the images of two sides of the document G are read, the front side image of the document G is read when the document G fed from the input tray 30 first passes through the scanning position of the slit glass 21, the back side image of the document G is read when the document passes therethrough a second time, and when the document passes therethrough a third time, scanning is not performed and the document G is discharged to the output tray 31. According to another aspect, when the fed document G first passes through the scanning position of the slit glass 21, a pre-scan is performed in which the front side image of the document G is read at a low resolution of, for example, less than 100 dpi, and when the document passes therethrough a second time, the back side image of the document G is read, and when the document passes therethrough a third time, the front side image of the document G is read, and then, the document is discharged to the output tray 31. This aspect can be easily realized by changing the timing of the scanning and the scanning condition outputted to the image scanner 22 from the CPU 101 in the structure of the MFD 1 of the previously described aspects. For this aspect, a modified example of the estimated free capacity calculation processing at the step S5 of the flowchart (FIG. 5) will be described with reference to the flowchart of FIG. 10.

First, at step S501, the free capacity M1 of the RAM 103 at the present time point is acquired by the CPU 101. Then, the document transfer process is started, and the document G is fed from the input tray 30 (S511). When the front side of the document G passes through the scanning position of the slit glass 21, the process to pre-scan the front side image of the document G is executed by the CPU 101 (S512). After the area of the front side of the document G is pre-scanned, the document G is stopped when the leading edge of the document G in the transfer direction is detected by the rear sensor 72 (S513). Next, the CPU 101 executes a process to calculate a rough data amount M3 of the front side image of the document G based on the data amount of the pres-can image acquired in step S512 (S514). As a specific example, the calculation process can include a process to multiply the pre-scan image by a specified weight coefficient, or a process to extract a corresponding set data amount from the table data in which set data amounts are made to correspond for plural pre-scan images. Thereafter, at step S515, the data amount M3 is subtracted from the free capacity M1, and the subtracted value provides the estimated free capacity M.

Also, according to this aspect, although the transfer of the document G is stopped at step S513, in the case where the two-sided scanning process of step S7 is executed before the leading edge of the document G in the transfer direction is detected by the rear sensor 72, it is unnecessary to stop the document G and delay the processing.

What is claimed is:

1. An apparatus for processing images previously-formed on first and second sides of a document based on a first condition, comprising:
    an image scanner having a scanning position, the image scanner scanning images on a document at the scanning position as the document and the scanning position move relative to each other;
    a first storage section configured to store image data scanned by the image scanner;
    memory configured store computer-executable instructions; and
    a processing unit configured to execute the computer-executable instructions that, when executed cause the image processing apparatus to provide:
        an estimate section configured to estimate an amount of data to be scanned based on estimate information;
        a judgment section configured to judge whether a rotation process to rotate one of a first side image and a second side image scanned by the image scanner can be performed based on the estimated data amount and an available storage capacity of the first storage section; and
        a change section configured to change a first condition by reducing the amount of data to be scanned by the image scanner from the first side or the second side of the document when the judgment section judges that the rotation process can not be performed,
    wherein when the judgment section judges that the rotation process can not be performed, the change section automatically reduces a set value of the scanning condition based on a previously determined reduction ratio.

2. The image processing apparatus according to claim 1, further comprising;
transfer elements for transferring the document along a first path, wherein the first side faces the scanning position, and transferring the document along a second path in which the second side faces the scanning position.

3. The image processing apparatus according to claim 2, wherein the transfer elements transfer the document along the second path after the document passes the scanning position along the first path and a transfer direction of the document is reversed, wherein the transfer elements transfer the document along the first path again after the document again passes the scanning position along the second path and the transfer direction of the document is reversed, and
the image scanner scans the first side image at least one time when the document passes through the scanning position along the first path and scans the second side image of the document when the document passes through the scanning position along the second path.

4. The image processing apparatus according to claim 1, wherein the image scanner executes scanning under a second condition that the amount of data to be scanned is small relative to the first condition.

5. The image processing apparatus according to claim 1, further comprising a second storage section configured to store a correspondence relation between the estimate information and a set data amount previously determined according to the estimate information,
wherein the estimate section extracts the set data amount corresponding to the estimate information, as the estimated data amount, from the correspondence relation stored in the second storage section.

6. The image processing apparatus according to claim 1, wherein the computer-executable instructions when executed by the processing unit further cause the image processing apparatus to provide a comparison section configured to compare a calculated value, obtained by subtracting the estimated data amount from the available storage capacity, with a threshold storage capacity required for the rotation process,
wherein the judgment section judges whether the rotation process can be performed based on a result of the comparison.

7. The image processing apparatus according to claim 1, further comprising a display,
wherein when the judgment section judges that the rotation process can not be performed, an indication that the rotation process can not be performed is displayed on the display.

8. The image processing apparatus according to claim 1, further comprising a controller configured to cause the estimate section to execute estimation and cause the judgment section to execute a judgment after the change section changes a set value of the first condition.

9. The image processing apparatus according to claim 1, further comprising an image processing section configured to execute a specified image processing in a case where the judgment section judges that the rotation process can be performed.

10. The image processing apparatus according to claim 9, wherein the specified image processing is at least one of a facsimile communication process to transmit images of the first side and the second side scanned by the image scanner to a communication partner, and an image recording process to record an image on a specified medium based on the images of the first side and the second side scanned by the image scanner.

11. An apparatus for processing images previously-formed on first and second sides of a document based on a first condition, comprising:
an image scanner having a scanning position, the image scanner scanning images on a document at the scanning position as the document and the scanning position move relative to each other;
a first storage section configured to store image data scanned by the image scanner;
memory configured store computer-executable instructions; and
a processing unit configured to execute the computer-executable instructions that, when executed cause the image processing apparatus to provide:
an estimate section configured to estimate an amount of data to be scanned based on estimate information;
a judgment section configured to judge whether a rotation process to rotate one of a first side image and a second side image scanned by the image scanner can be performed based on the estimated data amount and an available storage capacity of the first storage section; and
a change section configured to change a first condition by reducing the amount of data to be scanned by the image scanner from the first side or the second side of the document when the judgment section judges that the rotation process can not be performed,
wherein the image scanner executes scanning under a second condition that the amount of data to be scanned is small relative to the first condition.

12. The image processing apparatus according to claim 11, further comprising;
transfer elements for transferring the document along a first path, wherein the first side faces the scanning position, and transferring the document along a second path in which the second side faces the scanning position.

13. The image processing apparatus according to claim 12, wherein the transfer elements transfer the document along the second path after the document passes the scanning position along the first path and a transfer direction of the document is reversed, wherein the transfer elements transfer the document along the first path again after the document again passes the scanning position along the second path and the transfer direction of the document is reversed, and
the image scanner scans the first side image at least one time when the document passes through the scanning position along the first path and scans the second side image of the document when the document passes through the scanning position along the second path.

14. The image processing apparatus according to claim 11, wherein the computer-executable instructions when executed by the processing unit further cause the image processing apparatus to provide a comparison section configured to compare a calculated value, obtained by subtracting the estimated data amount from the available storage capacity, with a threshold storage capacity required for the rotation process,
wherein the judgment section judges whether the rotation process can be performed based on a result of the comparison.

15. The image processing apparatus according to claim 11, further comprising a display,
wherein when the judgment section judges that the rotation process can not be performed, an indication that the rotation process can not be performed is displayed on the display.

16. The image processing apparatus according to claim 11, further comprising a controller configured to cause the estimate section to execute estimation and cause the judgment section to execute a judgment after the change section changes a set value of the first condition.

17. The image processing apparatus according to claim 11, further comprising an image processing section configured to execute a specified image processing in a case where the judgment section judges that the rotation process can be performed.

18. The image processing apparatus according to claim 17, wherein the specified image processing is at least one of a facsimile communication process to transmit images of the first side and the second side scanned by the image scanner to a communication partner, and an image recording process to record an image on a specified medium based on the images of the first side and the second side scanned by the image scanner.

19. The image processing apparatus according to claim 1, further comprising a second storage section configured to store a correspondence relation between the estimate information and a set data amount previously determined according to the estimate information,
wherein the estimate section extracts the set data amount corresponding to the estimate information, as the estimated data amount, from the correspondence relation stored in the second storage section.

20. An apparatus for processing images previously-formed on first and second sides of a document based on a first condition, comprising:
an image scanner having a scanning position, the image scanner scanning images on a document at the scanning position as the document and the scanning position move relative to each other;
a first storage section configured to store image data scanned by the image scanner;
memory configured store computer-executable instructions; and
a processing unit configured to execute the computer-executable instructions that, when executed cause the image processing apparatus to provide:
an estimate section configured to estimate an amount of data to be scanned based on estimate information;
a judgment section configured to judge whether a rotation process to rotate one of a first side image and a second side image scanned by the image scanner can be performed based on the estimated data amount and an available storage capacity of the first storage section;
a change section configured to change a first condition by reducing the amount of data to be scanned by the image scanner from the first side or the second side of the document when the judgment section judges that the rotation process can not be performed, and
a second storage section configured to store a correspondence relation between the estimate information and a set data amount previously determined according to the estimate information,
wherein the estimate section extracts the set data amount corresponding to the estimate information, as the estimated data amount, from the correspondence relation stored in the second storage section.

21. An apparatus for processing images previously-formed on first and second sides of a document based on a first condition, comprising:
an image scanner having a scanning position, the image scanner scanning images on a document at the scanning position as the document and the scanning position move relative to each other;
a first storage section configured to store image data scanned by the image scanner;
an estimate section configured to estimate an amount of data to be scanned based on estimate information;
a judgment section configured to judge whether a rotation process to rotate one of a first side image and a second side image scanned by the image scanner can be performed based on the estimated data amount and an available storage capacity of the first storage section; and
a change section configured to change a first condition by reducing the amount of data to be scanned by the image scanner from the first side or the second side of the document when the judgment section judges that the rotation process can not be performed,
wherein when the judgment section judges that the rotation process can not be performed, the change section automatically reduces a set value of the scanning condition based on a previously determined reduction ratio.

* * * * *